United States Patent
Biran et al.

(10) Patent No.: US 11,275,644 B2
(45) Date of Patent: Mar. 15, 2022

(54) PROACTIVE VOLTAGE DROOP REDUCTION AND/OR MITIGATION IN A PROCESSOR CORE

(71) Applicant: International Business Machines Corporation, Armonk, NY (US)

(72) Inventors: Giora Biran, Zichron-Yaakov (IL); Pradip Bose, Yorktown Heights, NY (US); Alper Buyuktosunoglu, White Plains, NY (US); Pierce I-Jen Chuang, Briarcliff Manor, NY (US); Preetham M. Lobo, Bangalore (IN); Ramon Bertran Monfort, New York, NY (US); Phillip John Restle, Katonah, NY (US); Christos Vezyrtzis, New Rochelle, NY (US); Tobias Webel, Schwaebisch Gmuend (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 66 days.

(21) Appl. No.: 16/706,195

(22) Filed: Dec. 6, 2019

(65) Prior Publication Data
US 2020/0110656 A1     Apr. 9, 2020

Related U.S. Application Data

(63) Continuation of application No. 15/729,242, filed on Oct. 10, 2017, now Pat. No. 10,552,250.

(51) Int. Cl.
*G06F 11/00* (2006.01)
*G06F 11/07* (2006.01)
(Continued)

(52) U.S. Cl.
CPC ............ *G06F 11/0793* (2013.01); *G06F 1/28* (2013.01); *G06F 1/305* (2013.01); *G06F 1/324* (2013.01);
(Continued)

(58) Field of Classification Search
CPC .... G06F 11/0793; G06F 11/0721; G06F 1/28; G06F 1/305; G06F 1/324
See application file for complete search history.

(56) References Cited

U.S. PATENT DOCUMENTS

| | | | |
|---|---|---|---|
| 7,937,563 B2* | 5/2011 | Naffziger | G06F 9/3869 712/214 |
| 8,539,262 B2 | 9/2013 | Huang et al. | |

(Continued)

FOREIGN PATENT DOCUMENTS

| | | |
|---|---|---|
| EP | 2645203 A3 | 3/2016 |
| JP | 2006119777 A | 5/2006 |

(Continued)

OTHER PUBLICATIONS

Ye et al., "On-Chip Voltage-Droop Prediction Using Support-Vector Machines", IEEE 32nd VLSI Test Symposium (VTS), 2014, IEEE, 6 pages.

(Continued)

*Primary Examiner* — Philip Guyton
(74) *Attorney, Agent, or Firm* — Amin, Turocy & Watson, LLP

(57) ABSTRACT

Techniques facilitating voltage droop reduction and/or mitigation in a processor core are provided. In one example, a system can comprise a memory that stores, and a processor that executes, computer executable components. The computer executable components can comprise an observation component that detects one or more events at a first stage of a processor pipeline. An event of the one or more events can be a defined event determined to increase a level of power (Continued)

consumed during a second stage of the processor pipeline. The computer executable components can also comprise an instruction component that applies a voltage droop mitigation countermeasure prior to the increase of the level of power consumed during the second stage of the processor pipeline and a feedback component that provides a notification to the instruction component that indicates a success or a failure of a result of the voltage droop mitigation countermeasure.

20 Claims, 19 Drawing Sheets

(51) Int. Cl.
  *G06F 1/28* (2006.01)
  *G06F 1/324* (2019.01)
  *G06F 1/30* (2006.01)
  *G06F 9/38* (2018.01)

(52) U.S. Cl.
  CPC ........ *G06F 9/3836* (2013.01); *G06F 11/0721* (2013.01)

(56) References Cited

U.S. PATENT DOCUMENTS

| | | | |
|---|---|---|---|
| 10,552,250 B2 * | 2/2020 | Biran | G06F 1/28 |
| 2009/0300329 A1 | 12/2009 | Naffziger et al. | |
| 2011/0193589 A1 | 8/2011 | Chau-Eoan et al. | |
| 2012/0005515 A1 | 1/2012 | Reddi et al. | |
| 2014/0157033 A1 | 6/2014 | Eisen et al. | |
| 2015/0378412 A1 | 12/2015 | Suryanarayanan et al. | |
| 2018/0067541 A1 | 3/2018 | Chuang et al. | |

FOREIGN PATENT DOCUMENTS

| | | |
|---|---|---|
| JP | 2014500557 A | 1/2014 |
| WO | 2016160559 A1 | 10/2016 |
| WO | 2016164137 A1 | 10/2016 |
| WO | 2017053078 A1 | 3/2017 |

OTHER PUBLICATIONS

International Search Report and Written Opinion for International Patent Application No. PCT/EP2018/070998 dated Oct. 31, 2018, 13 pages.

Non-Final Office Action received for U.S. Appl. No. 15/729,242 dated May 28, 2019, 26 pages.

Office Action received for German Patent Application Serial No. 112018004142.5 dated Aug. 30, 2021, 8 pages (Including English Translation).

Examination Report under Section 18(3) for United Kingdom Application Serial No. GB2006469.7 dated Oct. 7, 2021, 4 pages.

Decision to Grant a Patent for Japanese Patent Application No. 2020-519735 dated Dec. 2, 2021, 2 pages.

* cited by examiner

PROACTIVE VOLTAGE DROOP REDUCTION AND/OR MITIGATION IN A PROCESSOR CORE

STATEMENT REGARDING FEDERALLY SPONSORED RESEARCH OR DEVELOPMENT

This invention was made with government support under HR0011-13-C-0022 awarded by Defense Advanced Research Projects Agency (DARPA). The government has certain rights to this invention.

BACKGROUND

The subject disclosure relates to on-chip supply noise voltage reduction and/or mitigation, and more specifically, proactive voltage droop reduction and/or mitigation in a processor core.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate proactive voltage droop reduction and/or mitigation are described.

According to an embodiment, a system can comprise a memory that stores computer executable components and a processor that executes the computer executable components stored in the memory. The computer executable components can comprise an observation component that detects one or more events at a first stage of a processor pipeline. An event of the one or more events can be a defined event determined to increase a level of power consumed during a second stage of the processor pipeline. The computer executable components can also comprise an instruction component that can apply a voltage droop mitigation countermeasure prior to the increase of the level of power consumed during the second stage of the processor pipeline based on the event being the defined event. In addition, the computer executable components can comprise a feedback component that can provide a notification to the instruction component. The notification can indicate a success or a failure of a result of the voltage droop mitigation countermeasure applied by the instruction component.

According to an embodiment, a computer-implemented method can comprise predicting, by a processor core, a voltage droop event based on a detection of a defined event occurring at a first stage of a processor pipeline. The defined event can be an event determined to increase a power consumption during a second stage of the processor pipeline. Further, the computer-implemented method can comprise applying, by the processor core, a voltage droop mitigation countermeasure based on the predicting. The second stage can occur a defined number of cycles after the first stage. Further, the applying the voltage droop mitigation countermeasure can be performed prior to the increase in the power consumption during the second stage.

According to another embodiment, a computer program product that facilitates proactive voltage droop mitigation can comprise a computer readable storage medium having program instructions embodied therewith. The program instructions can be executed by a processor. The program instructions can cause the processor to detect one or more events at a first stage of a processor pipeline. An event of the one or more events can be a defined event determined to increase a level of power consumed during a second stage of the processor pipeline. The program instructions can also cause the processor to apply a voltage droop mitigation countermeasure prior to the increase of the level of power consumed during the second stage of the processor pipeline based on the event being the defined event. Further, the program instructions can cause the processor to provide a notification that indicates a success or a failure of a result of the voltage droop mitigation countermeasure applied.

DETAILED DESCRIPTION

Figure 1:
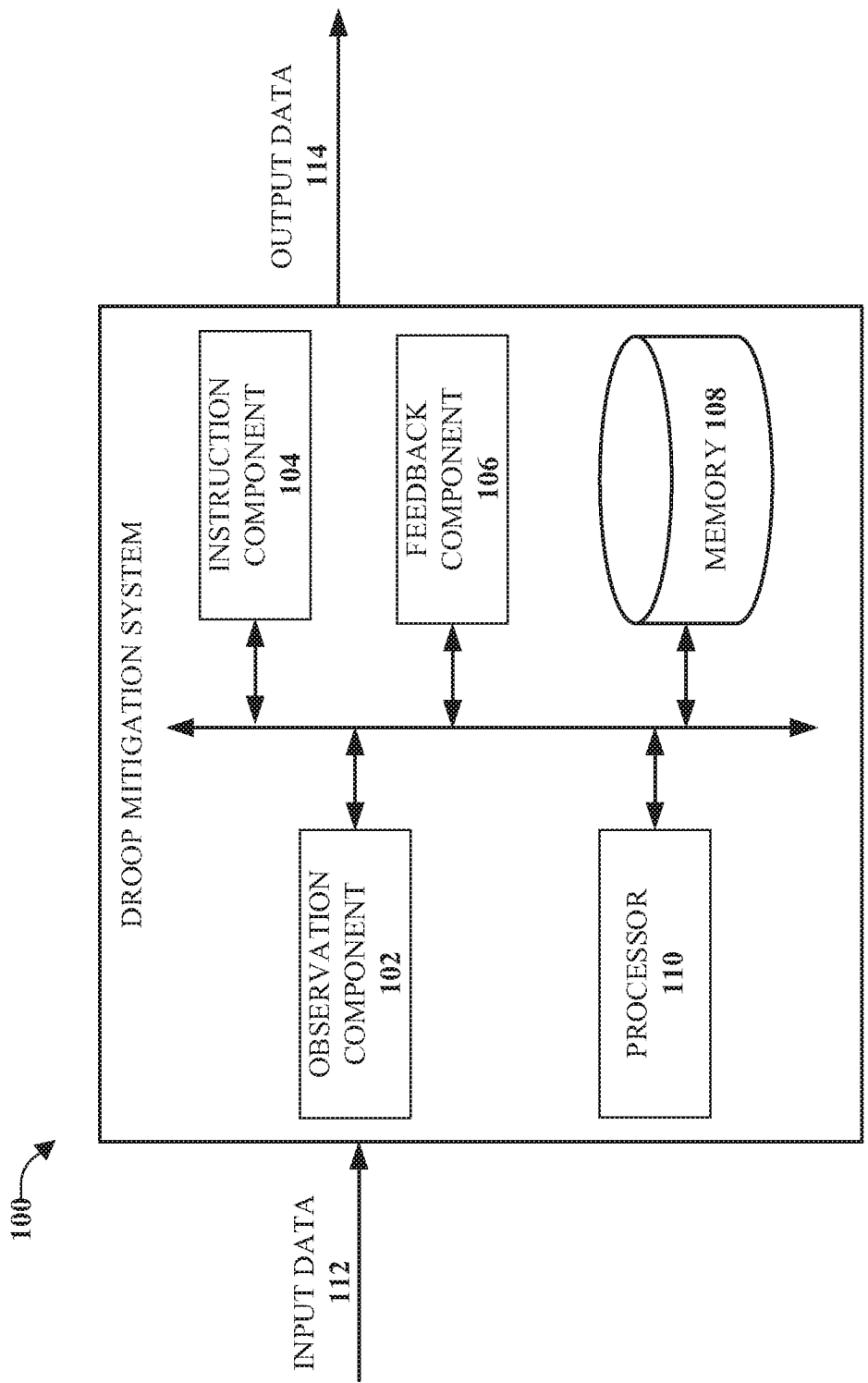
FIG. 1 illustrates a block diagram of an example, non-limiting, system that facilitates proactive voltage droop reduction and/or mitigation in a processor core in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Integrated circuits (e.g., processors) can receive power from a power source, such as a power supply, to provide a source voltage for the associated circuitry. The amount of current and the amount of circuit loading can be a function of an operating speed of the associated circuitry and the power supply voltage. Due to the active nature of the circuits, the circuit loading can vary, which can cause a supply voltage level to drop or to fall below a defined voltage level. The voltage drop from the defined voltage level is referred to as "voltage droop." For example, power supply noise can be generated from the power source and, further, can be propagated to the associated circuitry, which can cause voltage droops in various paths or units of a processor. The voltage droop (or more than one voltage droop) can affect the speed at which the processor operates.

The various aspects discussed herein relate to facilitating proactive voltage droop reduction and/or mitigation in a processor core in the case of large temporal gradients in load current. The proactive approach discussed herein can be enabled by reviewing the behavior of the processor during earlier stages of the processor pipeline to predict future power changes and, thus, prevent and/or mitigate those future power changes.

The proactive droop mitigation discussed herein can utilize selected events from earlier stages of a deep pipeline processor as predictors to determine sharp changes in the power over a short period of time. The early information of the selected events can be used to throttle the flow through the pipeline to prevent the sharp power change before the power change takes place. Accordingly, the voltage droop can be reduced and/or mitigated.

According to various implementations discussed herein, in a processor pipeline there can be various units (e.g., cores) that consume a proportionally large amount of power. An event can be proactively determined that indicates one (or more) of the various units in the processor pipeline is expected to consume a larger than usual amount of power and, therefore, could create a swing in terms of current and/or voltage noise. Based on the proactive determination, the voltage noise can be reduced and/or mitigated based on an instruction to throttle that is provided as early as possible in order to prevent and/or mitigate the sharp power change before the sharp power change takes place.

FIG. 1 illustrates a block diagram of an example, non-limiting, system 100 that facilitates proactive voltage droop reduction and/or mitigation in a processor core in accordance with one or more embodiments described herein. Aspects of systems (e.g., the system 100 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In various embodiments, the system 100 can be employed in any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can comprise tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like. As illustrated, the system 100 can comprise an observation component 102, an instruction component 104, a feedback component 106, at least one memory 108, and at least one processor 110.

There can be events caused by large temporal gradients in the load current. Based on these events, there can be more current and/or power dissipated suddenly in a processor core. Based on the current and/or power dissipation, there can be a voltage droop event where the supply voltage drops. In some cases, a static guard band can be set, such that an increased amount of supply voltage can be input in order to protect against the voltage droop event. With the disclosed aspects, a lower voltage set point can be utilized (e.g., no static guard band, or a smaller static guard band). The lower static guard band value can translate into performance and/or power savings since the processor does not have to operate at the higher voltage employed for the static guard band value.

The observation component 102 can detect one or more events at a first stage of a processor pipeline. For example, the processor pipeline can comprise multiple stages, where a first stage occurs earlier in time than a second stage. The second stage can occur earlier in time than a third stage, and so on. The one or more events can be events that can be determined to increase a power consumption during a second stage (or a subsequent stage) of the processor pipeline. For example, the observation component 102 can receive input data 112 from one or more sensors, such as noise sensors. Thus, the observation component 102 can receive, as input data 112, information related to noise occurring local to a processor core and/or noise occurring remote to the processor core (e.g., noise occurring at other processor cores). For example, if there is a power increase or a power decrease, the change in the power can create a voltage noise event, which can be detected by one or more sensors.

In an example, the observation component 102 can analyze logic behavior, which can be used to identify events that can cause an increase in the activity (and increase in the power consumption) in a few cycles down the logical pipeline. For example, a large amount of power can be dissipated when instructions are executed in the pipeline, which is where a large amount of the power swing can occur. Therefore, if there is a large number of instructions within five or ten cycles, for example, it can indicate a large power event, which can be used as a proactive indicator to prevent the voltage drop.

Thus, activity of one or more different components in the processor can be used to identify future power changes. Examples comprise, but are not limited to, a flush following an incorrect branch prediction, an exiting wait state/quiesce, cache miss response, a transition from a slow instruction stream to a fast instruction stream, an XCOND (e.g., an immediate reset condition that cancels all current executions, clears latches, and restores the processor to the last completed, checked, and saved state), and so on. In another example, a sharp increase in the in queue (inQ) write/dispatch/issue can be utilized as a predictor to an upcoming increase in power.

Based on the detection, by the observation component 102, of an event being the defined event, the instruction component 104 can apply a voltage droop mitigation countermeasure prior to an increase in the level of power consumed during the second stage of the processor pipeline. Thus, the system 100, based on the proactive voltage droop mitigation can initiate throttling multiple cycles earlier in comparison to reactive proactive voltage droop mitigation.

The voltage droop mitigation countermeasure can be output, by the instruction component 104, as output data 114. The voltage droop mitigation countermeasure applied by the instruction component 104 can increase a processing efficiency of the processor. Further, the processing efficiency can reduce the power consumed and/or increase a performance of the processor. Accordingly, the voltage droop mitigation countermeasure applied by the instruction component 104 can be proactive, or can occur prior to an actual voltage droop event.

As an example, let 1.0 volts (V) (1000 millivolts (mV)) be the set voltage with a worst-case voltage droop of 100 mV happening in 10 nanoseconds (ns). For example, a 10 mV drop in 1 ns. For a re-active voltage droop mitigation procedure, a defined threshold voltage value can be determined a priori. In this example, the defined threshold voltage is 60 mv. Therefore, the system 100 would have to wait until the voltage has dropped down 60 mv to take decision to throttle (e.g., before voltage droop mitigation can be implemented). Having a lesser defined threshold voltage value can lead to over throttling, which can impact performance. As illustrated, it can take an additional 2 ns (10 cycles) for the throttle indication to be received at the processor cores. Therefore, the voltage would have dropped 20 mV more before going back up. If the 100 mV droop is reduced to 80 mV, it can provide 20 mV overall guard band reduction (e.g., a 2% benefit).

According to various aspects discussed herein, for proactive voltage droop mitigation, if a droop is detected at −20 mV to take decision to throttle, and if it takes 2 ns for the throttle indication to reach the processor cores, the voltage would have dropped 20 mV more before going back up. Thus, the lowest voltage hit is −40 mV, which can result in about 60 mV gain (e.g., around a 6% benefit) in accordance with the various aspects provided herein.

With continuing reference to FIG. 1, the feedback component 106 can receive, as input data 112, information related to whether the voltage droop mitigation countermeasure resulted in a reduction and/or mitigation of a voltage droop at the second stage of the processor pipeline. The feedback component 106 can provide a notification to the instruction component 104 upon or after implementation of the voltage droop mitigation countermeasure. The notification can indicate a success or a failure of a result of the voltage droop reduction and/or mitigation countermeasure. Thus, the feedback component 106 can provide a feedback loop that can be utilized to adjust a future proactive voltage droop mitigation countermeasure. According to some implementations, the feedback component 106 can provide the feedback loop in order to provide information related to a current voltage droop mitigation countermeasure, which can result in a change to the mitigation countermeasure, a continuance of the current mitigation countermeasure, or discontinuing the mitigation countermeasure.

The at least one memory 108 can store computer executable components and/or computer executable instructions, which can be implemented by the at least one processor 110 (or a processor core). The at least one memory 108 can store protocols associated with implementing proactive voltage droop reduction and/or mitigation as discussed herein. Further, the at least one memory 108 can facilitate action to control communication such that the system 100 can employ stored protocols and/or algorithms to achieve proactive voltage droop reduction and/or mitigation as described herein.

Figure 2:
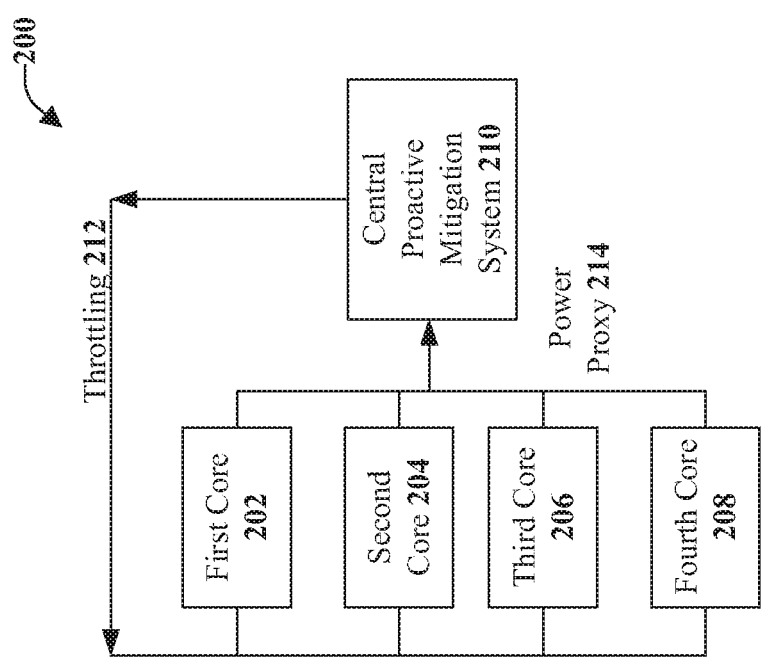
FIG. 2 illustrates an example, non-limiting, system for proactive voltage droop reduction and/or mitigation shared between cores of a processor in accordance with one or more embodiments described herein.

FIG. 2 illustrates an example, non-limiting, system 200 for proactive voltage droop reduction and/or mitigation shared between cores of a processor in accordance with one or more embodiments described herein. Repetitive description of like elements employed in other embodiments described herein is omitted for sake of brevity. The system 200 can comprise one or more of the components and/or functionality of the system 100, and vice versa.

As illustrated, a processor can comprise a multitude of cores, illustrated as a first core 202, a second core 204, a third core 206, and a fourth core 208. It is noted that although four cores are shown and described, a processor can comprise four cores, less than four cores, or more than four cores according to various aspects.

According to an example, in a multi-core processor, depending on the maximal d(i)/d(t) and the RLC (resistor, inductor, capacitor) characteristics of the design, it could be that a sharp change in the power of a single core is not large enough to cause a need for implementation of a droop mitigation countermeasure. In this case, the power management logic discussed herein can share the knowledge on the activity level between the cores.

For example, in FIG. 2 a central proactive mitigation system 210 (e.g., the system 100 of FIG. 1) can be utilized to share a throttling instruction 212 and power proxy information 214 among the multiple cores. Accordingly, the power management logic can be common for all cores (e.g., global).

Figure 3:
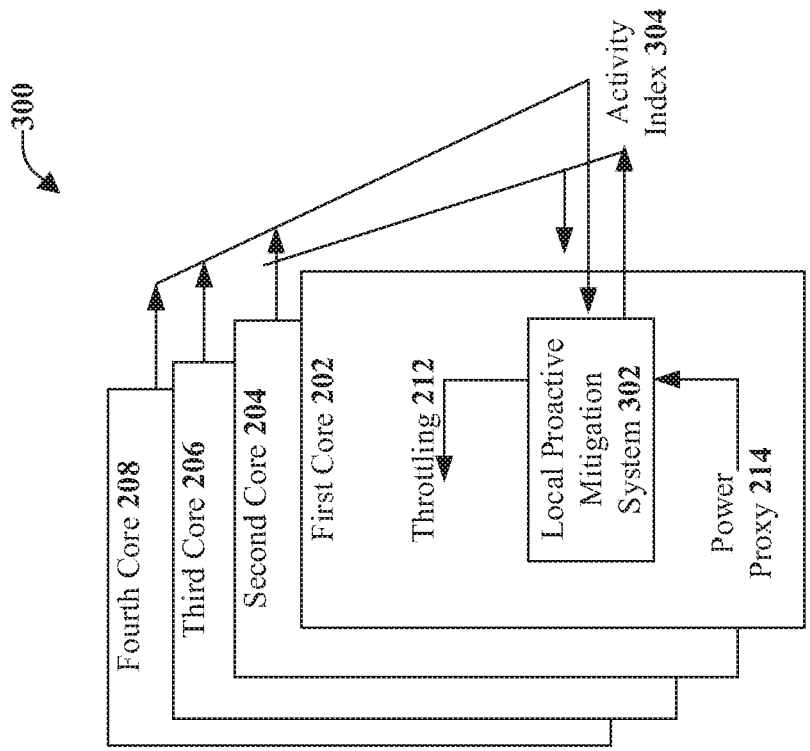
FIG. 3 illustrates an example, non-limiting system of an alternative implementation of proactive voltage droop reduction and/or mitigation shared between cores of a processor in accordance with one or more embodiments described herein.

FIG. 3 illustrates an example, non-limiting, system 300 of an alternative implementation of proactive voltage droop reduction and/or mitigation shared between cores of a processor in accordance with one or more embodiments described herein. Repetitive description of like elements employed in other embodiments described herein is omitted for sake of brevity. The system 300 can comprise one or more of the components and/or functionality of the system 100 and vice versa.

As illustrated in FIG. 3, a local proactive mitigation system 302 (e.g., the system 100 of FIG. 1) can be utilized to share the throttling instruction 212 and power proxy information 214 among the cores. Further, an activity index 304 from/to other cores can be included in the system 300. Accordingly, the power management logic can be local to the core (e.g., the first core 202) and communicated to the other cores (e.g., the second core 204, the third core 206, the fourth core 208, and so on).

Figure 4:
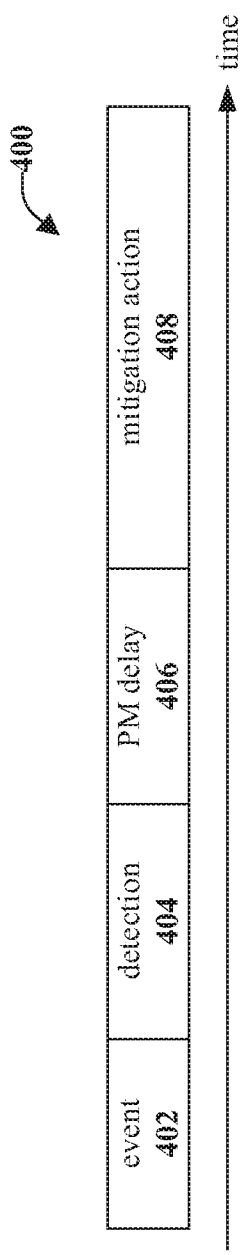
FIG. 4 illustrates an example, non-limiting, timeline based on the use of a reactive mitigation action.

FIG. 4 illustrates an example, non-limiting, timeline based on the use of a reactive mitigation action. In this timeline 400, there is no prediction utilized before applying a mitigation action (e.g., it is a reactive mitigation action). Time is represented along the horizontal axis. As illustrated, an event 402 occurs at a first time, and upon or after the occurrence of the event 402, detection 404 of the event occurs. Upon or after the detection 404, there can be a delay 406 before the mitigation action 408 can occur. The delay 406 can be based on the time it can take for a determination as to which mitigation countermeasure to apply, the instruction signal(s) to be transmitted, the instruction signal(s) to be received at the processor core, and for the processor core to implement the mitigation action 408.

Figure 5:
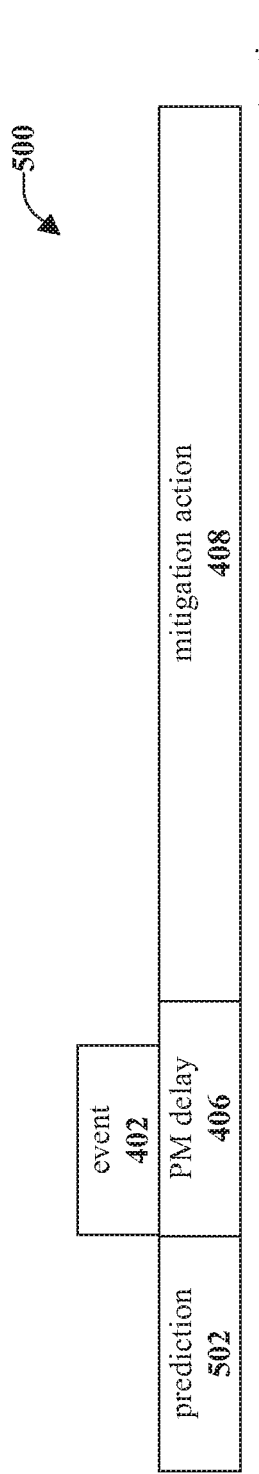
FIG. 5 illustrates an example, non-limiting, timeline when a proactive mitigation action is applied in accordance with one or more embodiments described herein.

FIG. 5 illustrates an example, non-limiting, timeline when a proactive mitigation action (e.g., countermeasure) is applied in accordance with one or more embodiments described herein. Repetitive description of like elements employed in other embodiments described herein is omitted for sake of brevity.

Time is represented along the horizontal axis. As illustrated at a first time, prediction 502 of an event occurs (e.g., via the observation component 102) and an instruction can be sent (e.g., via the instruction component 104). Upon or after a delay 406 (e.g., time for instruction(s) to be transmitted/received), the mitigation action 408 can be applied at the processor core. It is noted that, because the implementation of the mitigation countermeasure is proactive, the event 402 occurs during the delay 406. Accordingly, the mitigation action 408 can be performed faster than the case represented in FIG. 4.

Figure 6:
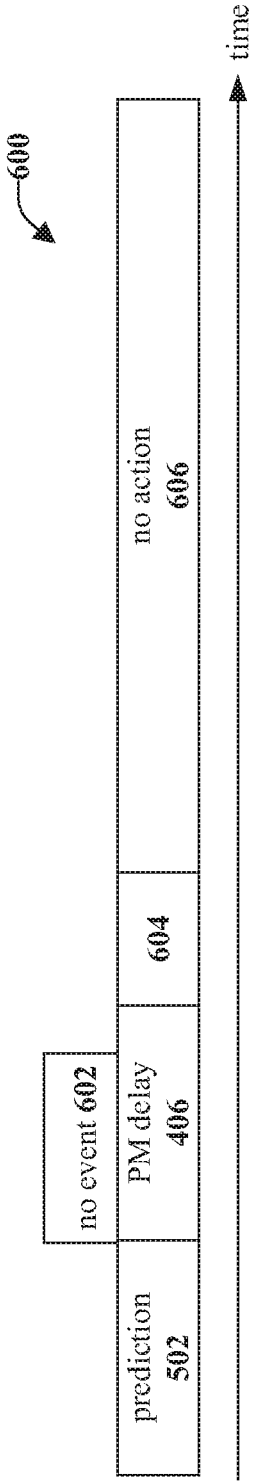
FIG. 6 illustrates an example, non-limiting timeline when a proactive mitigation action is implemented, but the event does not occur in accordance with one or more embodiments described herein.

FIG. 6 illustrates an example, non-limiting timeline when a proactive mitigation action is implemented, but the event does not occur in accordance with one or more embodiments described herein. Repetitive description of like elements employed in other embodiments described herein is omitted for sake of brevity.

Time is represented along the horizontal axis. As illustrated, prediction 502 occurs and signals to implement the mitigation countermeasure can be transmitted. However, it can be determined that no event 602 has occurred. For example, although it was determined earlier in the processor pipeline that an event indicated a voltage droop event, the processor core did not experience the voltage droop event. Therefore, at 604, another instruction can be transmitted to reverse the mitigation countermeasure and/or to not implement the mitigation countermeasure. Accordingly, there is no action 606 taken or, if an action was taken, that action can be reversed or stopped.

Figure 7:
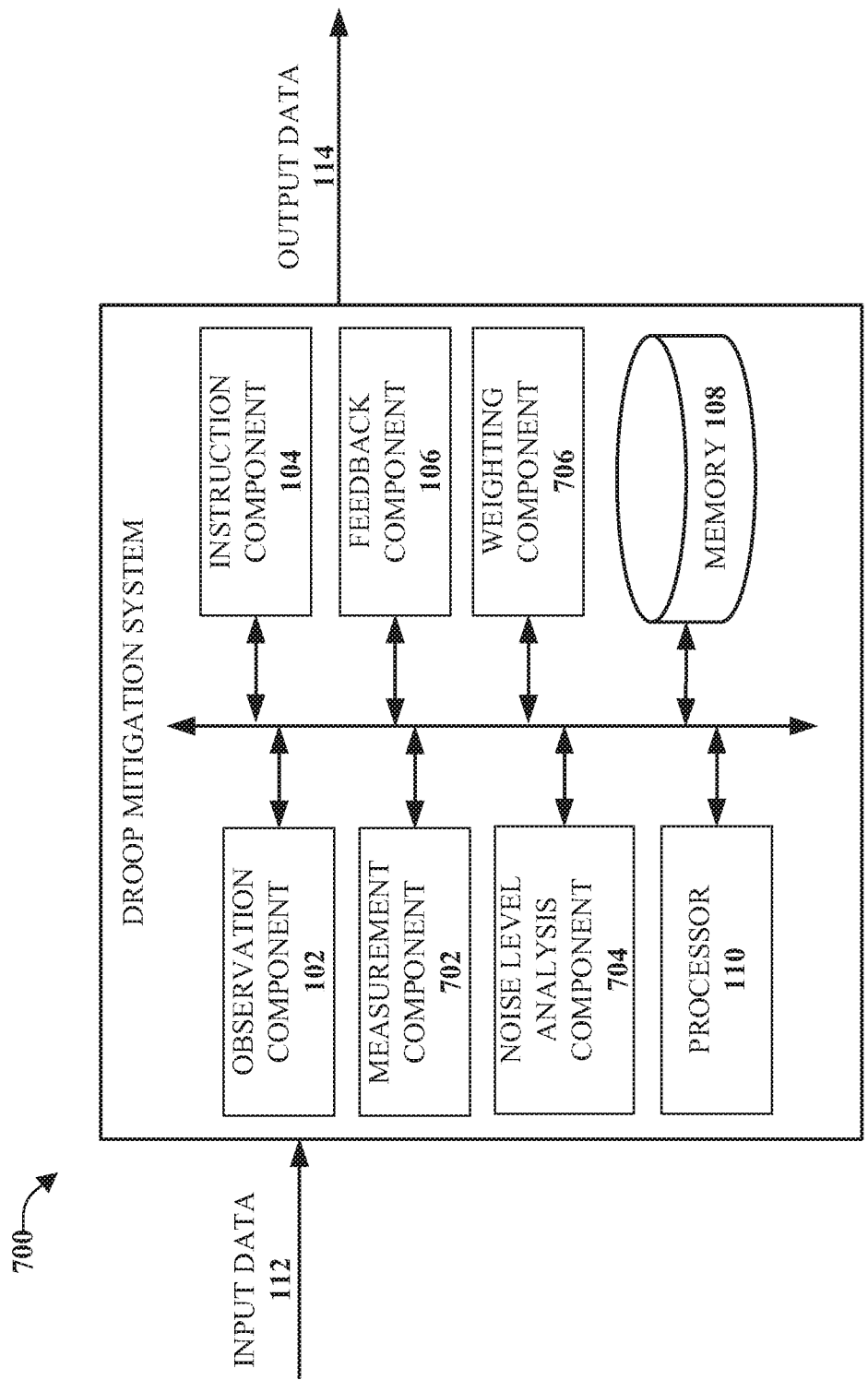
FIG. 7 illustrates an example, non-limiting, system for implementing a voltage droop mitigation countermeasure based on a local noise level at a processor core in accordance with one or more embodiments described herein.

FIG. 7 illustrates an example, non-limiting, system 700 for implementing a voltage droop mitigation countermeasure based on a local noise level at a processor core in accordance with one or more embodiments described herein. Repetitive description of like elements employed in other embodiments described herein is omitted for sake of brevity. The system 700 can comprise one or more of the components and/or functionality of the system 100, the system 200, the system 300, and vice versa. According to some implementations, the instruction component 104 can generate a throttling indication (or throttling instruction) as the voltage droop mitigation countermeasure. For example, the throttling indication can be generated by the instruction component 104 based on a determination that an activity level, at the second stage of the processor pipeline, satisfied a defined activity level and that a remote noise level, at the second stage, satisfied a defined remote noise level.

Further to this implementation, a measurement component 702 can measure a local noise level. For example, the local noise level can be the noise measured locally (e.g., at the processor core). The measurement component 702 can measure the local noise level directly and/or can interface with one or more local noise sensors or indicators to receive information indicative of the local noise level.

Based on the local noise level provided by the measurement component 702, a noise level analysis component 704 can determine whether the local noise level is above or below a defined local noise level amount. The defined local noise level amount can be based on an amount of noise that can be tolerated before a mitigation countermeasure should be implemented. If the local noise level is above the defined local noise level amount, the instruction component 104 can generate a throttling instruction, or can continue to generate a throttling instruction if the throttling instruction is already being transmitted. However, if the local noise level is below the defined local noise level amount, the instruction component 104 can reduce a throttling level indicated in the throttling instruction. In some implementations, if the local noise level is below the defined local noise level amount, the instruction component 104 can send an instruction to stop throttling.

Figure 8:
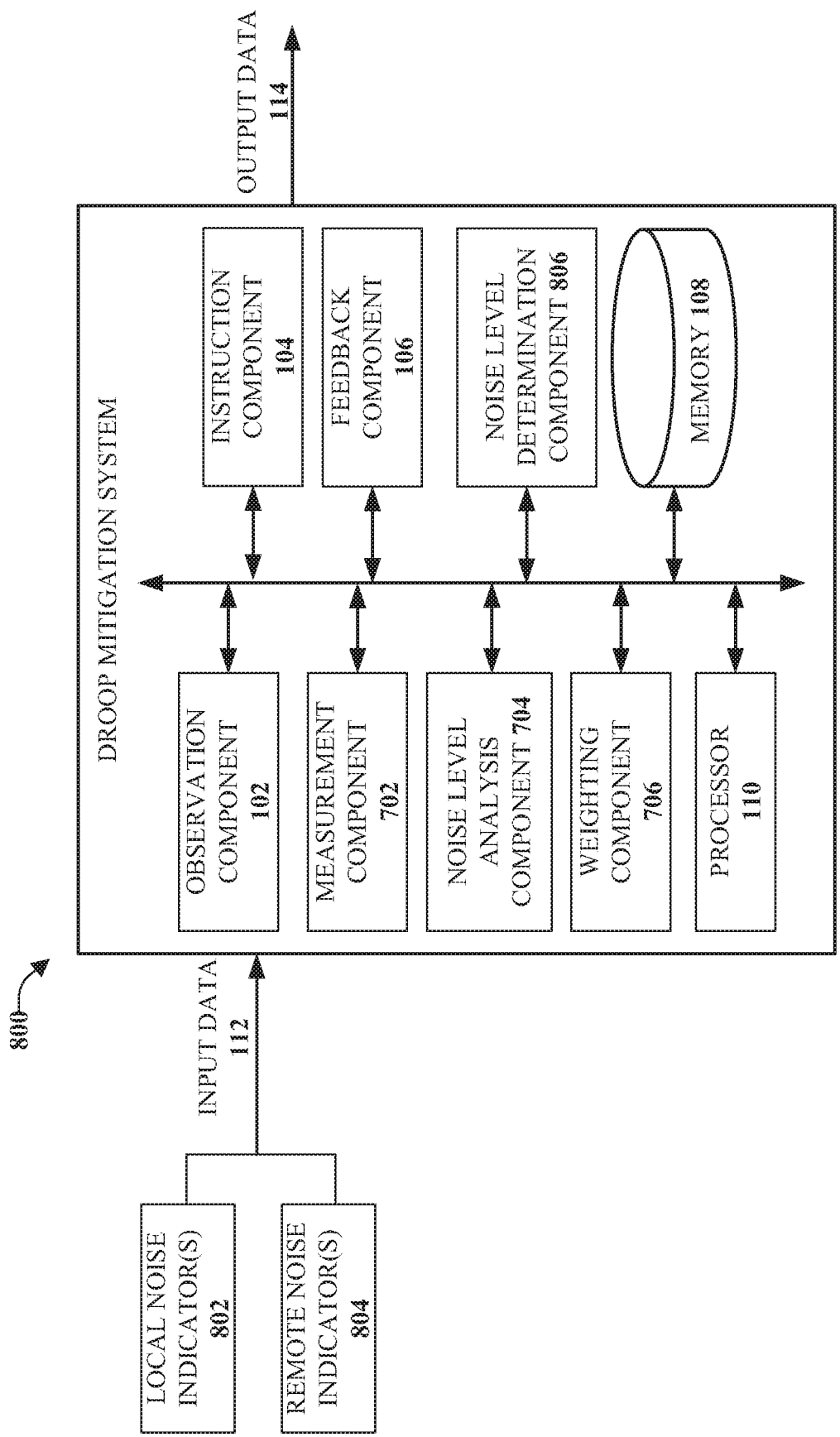
FIG. 8 illustrates an example, non-limiting, system for implementing a voltage droop mitigation countermeasure based on a local noise level at a processor core and one or more remote noise levels in accordance with one or more embodiments described herein.

FIG. 8 illustrates an example, non-limiting, system for implementing a voltage droop mitigation countermeasure based on a local noise level at a processor core and one or more remote noise levels in accordance with one or more embodiments described herein. Repetitive description of like elements employed in other embodiments described herein is omitted for sake of brevity.

The system 800 can comprise one or more of the components and/or functionality of the system 100, the system 200, the system 300, and/or the system 700, and vice versa.

At least one local noise indicator 802 (or local noise sensor) can measure a local noise level at the processor core and the measurement component 702 can receive the local noise level indication as input data 112. Further, one or more remote noise indicators 804 (or remote noise sensors) can measure one or more remote noise levels. For example, the local noise indicator 802 can measure a noise level at a first processor core and at least a first remote noise indicator of the one or more remote noise indicators 804 can measure a first remote noise level at a second processor core, which can be adjacent the first processor core. Further, at least a second remote noise indicator of the one or more remote noise indicators 804 can measure a second remote noise level at a third processor core, which can be adjacent the first processor core and/or the second processor core. Subsequent remote noise indicators of the one or more remote noise indicators 804 can measure subsequent remote noise levels at subsequent processor cores of the processor according to an implementation.

Based on the measurements received as input data 112, a noise level determination component 806 can calculate an overall noise score. For example, the overall noise score can be a combination of the local noise level, determined by the local noise indicator 802, and the remote noise levels determined by the remote noise indicators 804. In some implementations, more than one local noise level measured by more than one local noise indicator and/or more than one remote noise level measured by more than one remote noise indicator can be utilized by the noise level determination component 806 to calculate the overall noise score.

Further, in some implementations, the weighting component 706 can apply respective weights to the one or more local noise levels and/or the remote noise levels and the overall noise score calculated by the noise level determination component 806 can be based on the weighted values. For example, the respective weights applied by the weighting component 706 can be a function of accuracy and/or reliability of the various noise indicators.

The instruction component 104 can determine the throttling level based on a throttling value defined by the overall noise score. According to some implementations, the instruction component 104 can reference a throttle actuation table to determine the throttling level. Thus, the instruction component 104 can compute the throttling level based on a table (or more than one table) that translates overall score to the throttling level. For example, Table 1 below illustrates an example, non-limiting, throttling table that can be utilized to invoke throttling according to an implementation.

TABLE 1

| Predictive noise sensor | Remote Noise | Throttle (T) |
|---|---|---|
| Low | Low | No |
| Low | High | No |
| High | Low | No |
| High | High | Yes |

According to the above example Table 1, when the predictive noise sensor (e.g., the local noise indicator 802) indicates a low noise value in the processor core, a throttle signal is not sent by the instruction component 104. Further, when a predictive noise sensor indicates a high local noise value, but the remote noise value is low, the instruction component 104 does not transmit a throttle signal. However, according to Table 1, if the predictive noise sensor shows a high activity level, and the remote noise determined by the remote noise indicators 804 also show a high noise value, throttling can be invoked by the instruction component 104.

In another example, Table 2 below illustrates an example, non-limiting, throttling table that can be utilized in accordance with the disclosed aspects.

TABLE 2

| Local Noise | Throttle (T) | Throttle (T-x) |
|---|---|---|
| Low | No | No |
| Low | Yes | No |
| High | No | No |
| High | Yes | Yes |

Thus, according to the example of Table 2, the delayed version of the throttle signal can be checked with local noise, and if the local noise is also high, the throttling can be maintained. However, if the local noise is low, the throttling can be brought down (or corrected). In one example according to Table 2, if the local noise is low and the system is not already throttling, then the instruction component 104 can continue to not throttle. In another example, if the local noise is low and throttling is being performed, throttling can be stopped. If the local noise is high, and throttling is not being performed, the system can continue to not throttle. However, if the local noise is high, and throttling is being performed, the problem is not being corrected and, therefore, the instruction component 104 can send a signal to throttle more.

Figure 9:
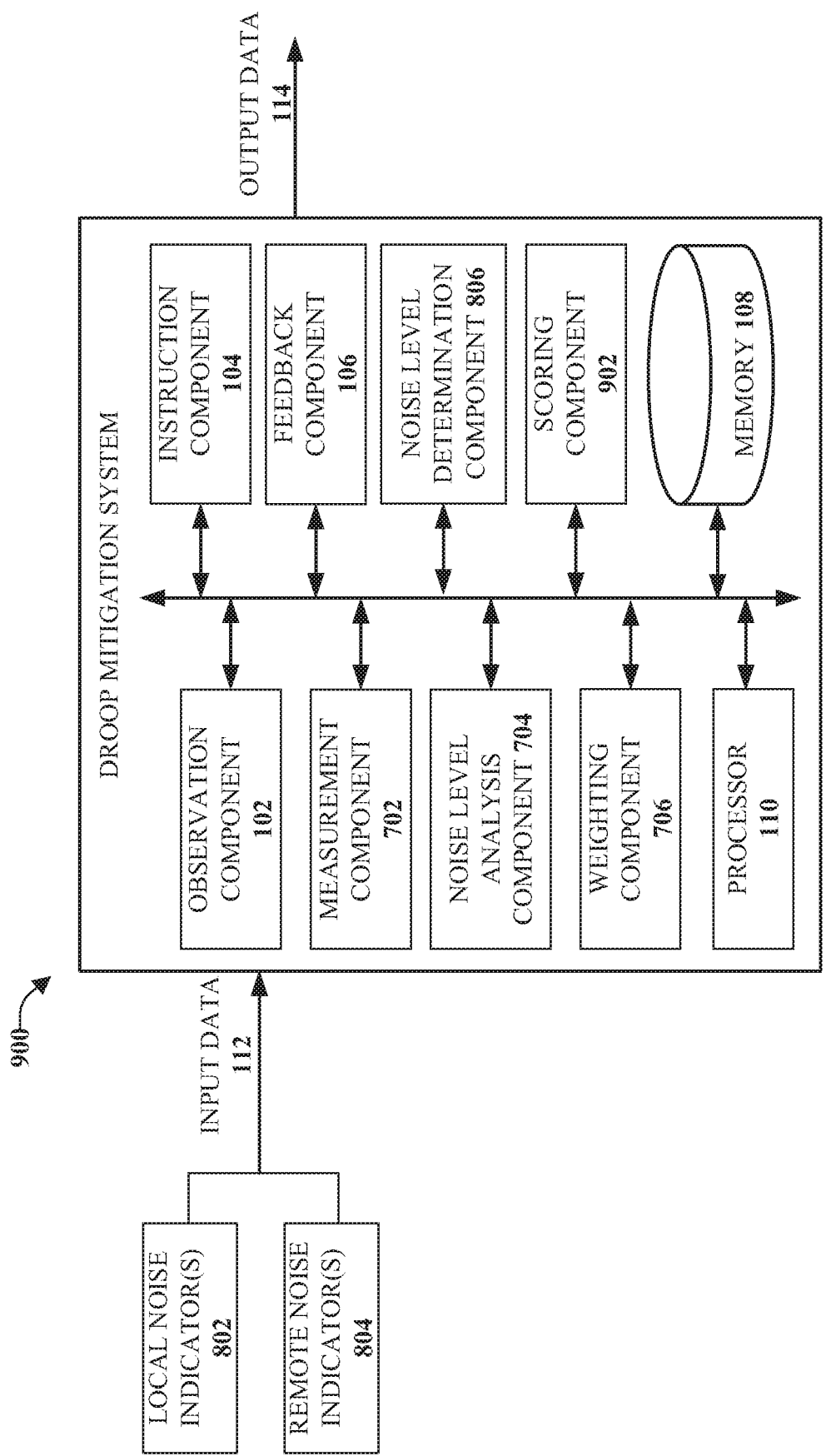
FIG. 9 illustrates an example, non-limiting, system for applying a weighted score to one or more noise levels to determine a throttling level in accordance with one or more embodiments described herein.

FIG. 9 illustrates an example, non-limiting, system 900 for applying a weighted score to one or more noise levels to determine a throttling level in accordance with one or more embodiments described herein. Repetitive description of like elements employed in other embodiments described herein is omitted for sake of brevity.

The system 900 can comprise one or more of the components and/or functionality of the system 100, the system 200, the system 300, the system 700, and/or the system 800, and vice versa. The one or more noise indicators (e.g., the local noise indicator 802, the remote noise indicator 804, one or more other local noise indicators, and/or one or more other remote noise indicators) can determine respective noise levels. A scoring component 902 can determine a total value (e.g., a single value) for all the noise levels based on respective weights applied to respective outputs of the one or more noise indicators (e.g., via the weighting component 706). The instruction component 104 can apply a throttling level based on the total value determined by the scoring component 902.

Figure 10:
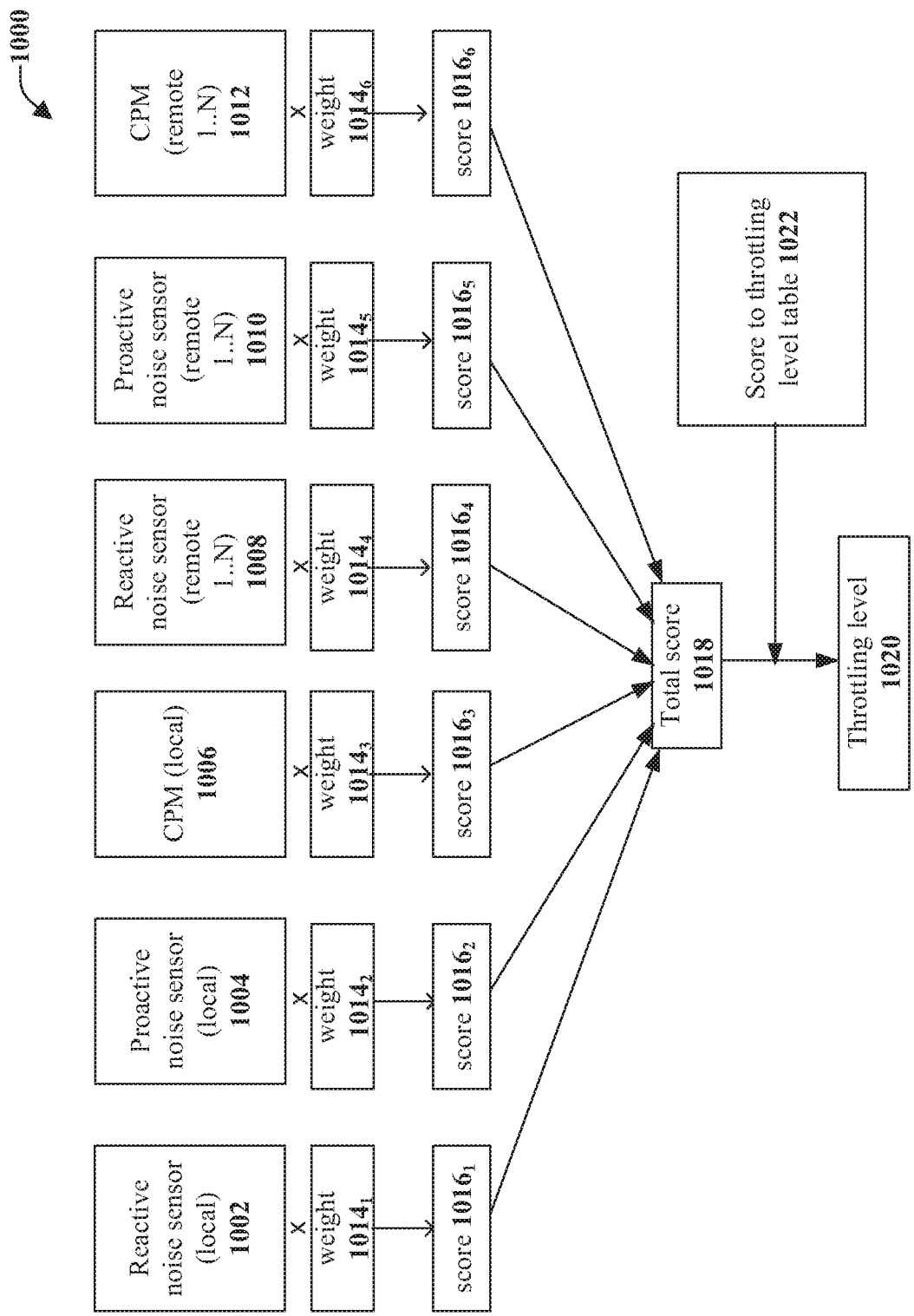
FIG. 10 illustrates an example, non-limiting, system that implements a continuous (or continual) throttling level based on information received from a variety of noise indicators in accordance with one or more embodiments described herein.

In further detail, FIG. 10 illustrates an example, non-limiting, system 1000 that implements a continuous (or continual) throttling level based on information received from a variety of noise indicators in accordance with one or more embodiments described herein. Repetitive description of like elements employed in other embodiments described herein is omitted for sake of brevity.

The system 1000 can comprise one or more of the components and/or functionality of the system 100, the system 200, the system 300, the system 700, the system 800, and/or the system 900, and vice versa. The system 1000 can comprise at least one local reactive noise sensor 1002, at least one local proactive noise sensor 1004, and at least one local critical path monitor 1006 (e.g., the local noise indicators 802). Further, the system 1000 can comprise one or more reactive remote noise sensors 1008, one or more proactive remote noise sensors 1010, and/or one or more remote critical path monitors 1012 (e.g., the remote noise indicators 804). The one or more sensors or indicators can measure noise, represented as noise information (e.g., the input data 112). The respective noise information from the various sensors can be weighted and scored (e.g., via the weighting component 706 and the scoring component 902).

Thus, information measured by the at least one local reactive noise sensor 1002 can be assigned a first weight $1014_1$ and a result of the measurement multiplied by the first weight $1014_1$ can result in a first score $1016_1$ for the at least one local reactive noise sensor 1002. Further, information measured by the at least one local proactive noise sensor 1004 can be assigned a second weight $1014_2$ and a result of the measurement multiplied by the second weight $1014_2$ can result in a second score $1016_2$ for the at least one local proactive noise sensor 1004. The information measured by the at least one local critical path monitor 1006 can be assigned a third weight $1014_3$ and a result of the measurement multiplied by the third weight $1014_3$ can result in a third score $1016_3$ for the at least one local critical path monitor 1006.

Further, information measured by the one or more reactive remote noise sensors 1008 can be assigned respective fourth weights $1014_4$ and a resulting fourth score $1016_4$ for the one or more reactive remote noise sensors 1008 can be determined. The information measured by the one or more proactive remote noise sensors 1010 can be assigned respective fifth weights $1014_5$ and a resulting fifth score $1016_5$ for the one or more proactive remote noise sensors 1010 can be determined. In addition, the information measured by the one or more remote critical path monitors 1012 can be assigned respective sixth weights $1014_6$ and a resulting sixth score $1016_6$ for the one or more remote critical path monitors 1012 can be determined.

The weights applied to the one or more sensors can be based on the accuracy and/or reliability of the individual sensor. The scores can be negative or positive. According to an implementation, a negative score can indicate that no noise (or noise below a defined noise level) was measured; a positive score can indicate the presence of noise. However, in some implementations, a negative score can indicate the presence of noise, while a positive score can indicate that no noise was measured.

The first score $1016_1$, the second score $1016_2$, the third score $1016_3$, the fourth score $1016_4$, the fifth score $1016_5$, and/or the sixth score $1016_6$ can be combined as a total score 1018 by, for example, the scoring component 902. Based, at least in part, on the total score 1018, a selected throttling level 1020 can be applied (e.g., via the instruction component 104). For example, the throttling level 1020 can be computed based on a table that can translate an overall score to a throttling level 1022. By way of example and not limitation, example Table 1 and/or example Table 2 discussed above can be utilized.

Figure 11:
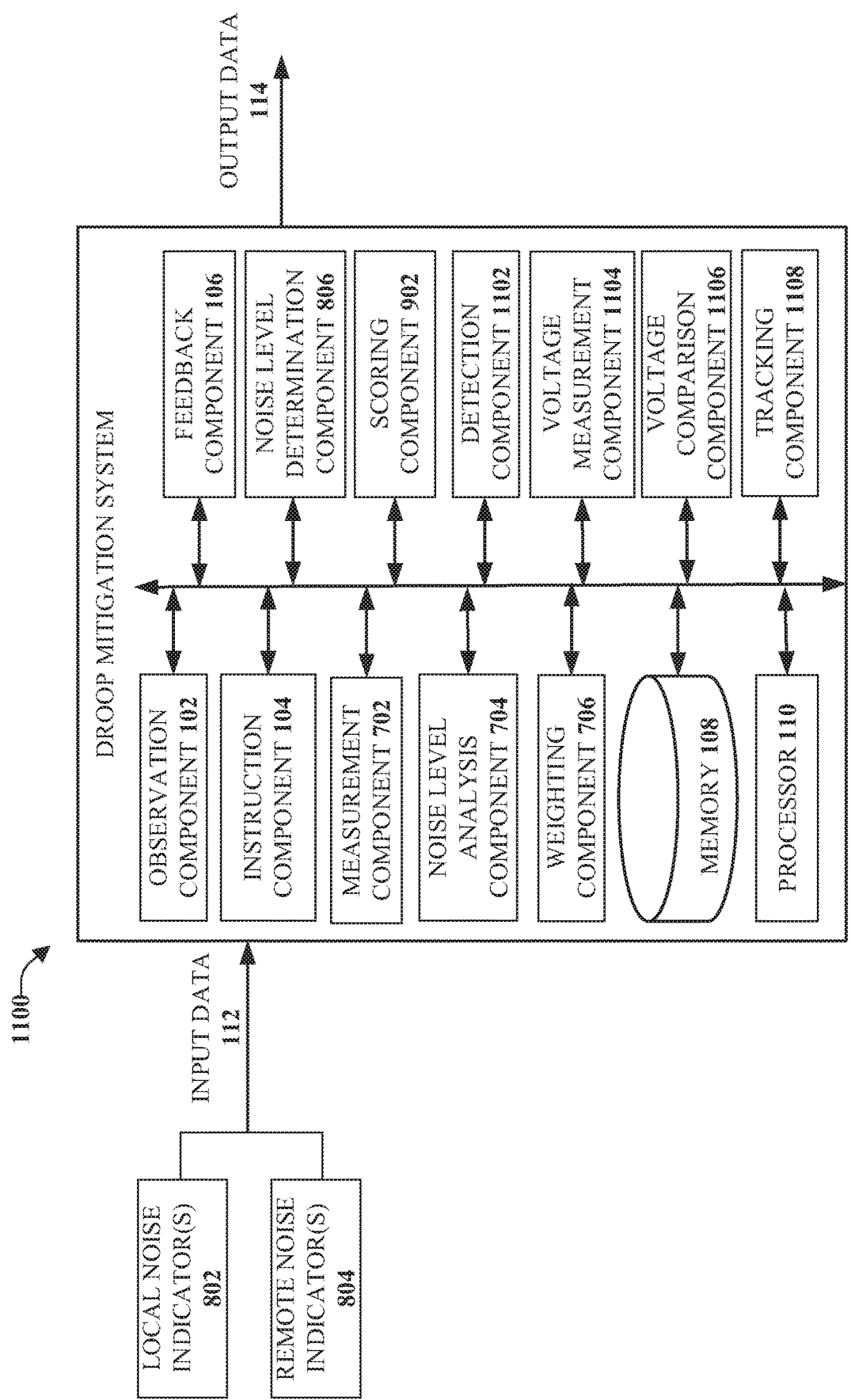
FIG. 11 illustrates an example, non-limiting, system for providing a feedback loop based on one or more proactive droop mitigation countermeasures implemented at a processor core in accordance with one or more embodiments described herein.

FIG. 11 illustrates an example, non-limiting, system 1100 for providing a feedback loop based on one or more proactive droop mitigation countermeasures implemented at a processor core in accordance with one or more embodiments described herein. Repetitive description of like elements employed in other embodiments described herein is omitted for sake of brevity.

The system 1100 can comprise one or more of the components and/or functionality of the system 100, the system 200, the system 300, the system 700, the system 800, the system 900, and/or the system 1000, and vice versa. A detection component 1102 can determine an occurrence of a voltage droop event at the second stage of the processor core. For example, the observation component 102 detected one or more events a first stage of the processor pipeline. The events at the first stage were used to predict that a voltage droop was expected to occur at the second stage. Accordingly, the detection component 1102 can determine whether the expected voltage droop did in fact occur at the second stage of the processor core.

The determination by the detection component 1102 can be made based on a voltage, measured by a voltage measurement component 1206, at the second stage of the processor pipeline. The measured voltage can be compared to an expected voltage by a voltage comparison component 1106. If the measured voltage is different from the expected voltage by a defined voltage level, it can indicate that the voltage droop did not occur, or that the voltage droop was larger than expected, for example.

A tracking component 1108 can retain information related to the determination by the detection component 1102. For example, the information retained can be a determination that the event (or the one or more events) was the defined event(s) and caused the expected voltage droop at the second stage. The information can be retained as historical information (e.g., in the at least one memory 108). The historical information can be utilized during a subsequent proactive prediction and voltage reduction and/or mitigation countermeasure in accordance with the various aspects discussed herein.

Figure 12:
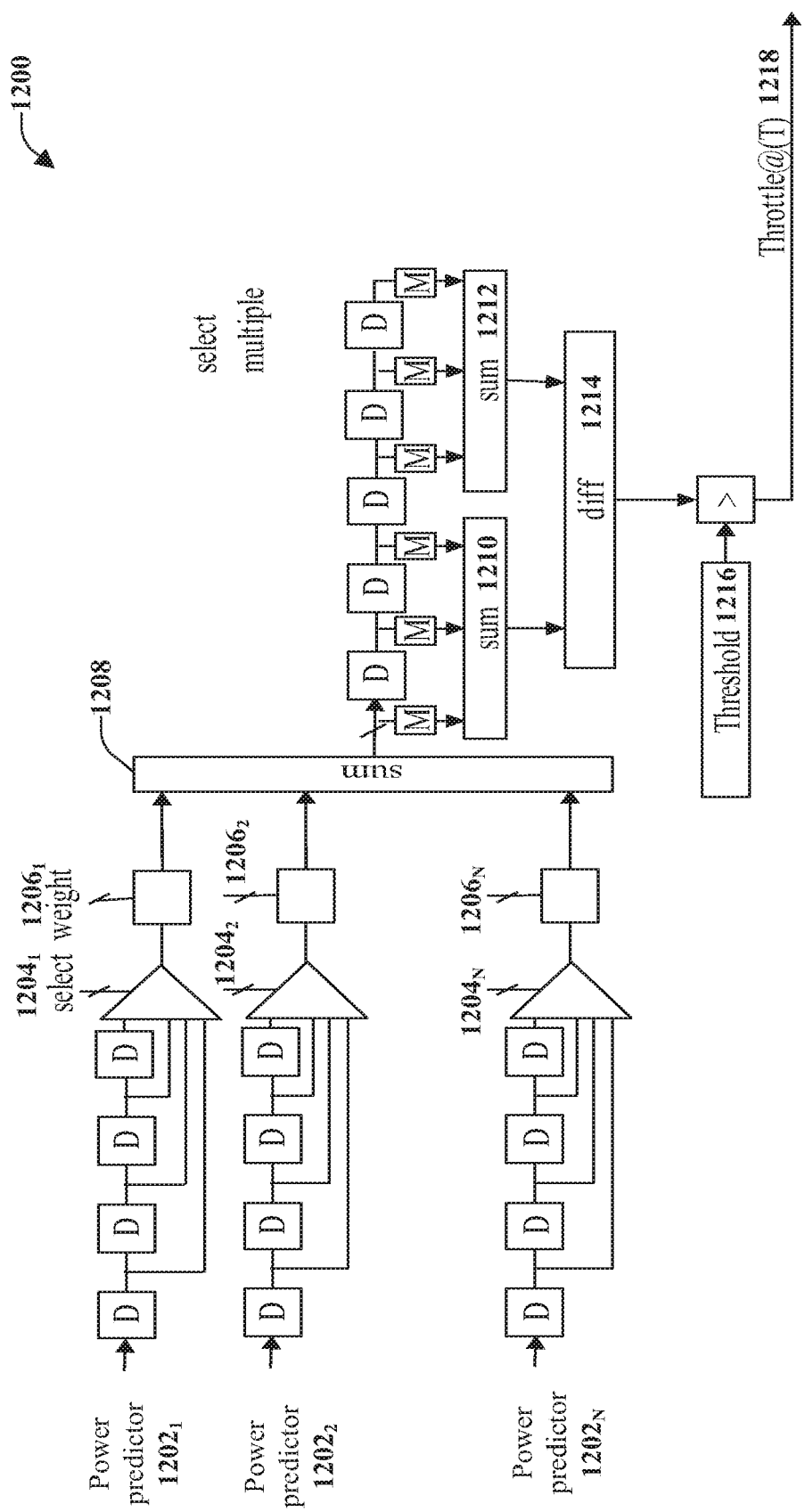
FIG. 12 illustrates an example, non-limiting, implementation that utilizes power predictor signals in accordance with one or more embodiments described herein.

FIG. 12 illustrates an example, non-limiting, implementation that utilizes power predictor signals for a logic flow 1200 in accordance with one or more embodiments described herein. Repetitive description of like elements employed in other embodiments described herein is omitted for sake of brevity.

As illustrated, inputs can include respective power predictor signals, namely a first power predictor signal $1202_1$, a second power predictor signal $1202_2$, through an Nth power predictor signal $1202_N$, where N is an integer. The respective power predictor signals $1202_1$, $1202_2$, through $1202_N$ can be signals that are early pipeline indications of future activity (e.g., at a second stage of a processor core).

The power predictive signals $1202_1$, $1202_2$, through $1202_N$ can be processed through one or more programmable delays (indicated by "D" within the square boxes). Although four programmable delays are illustrated for the various power predictors, any number of programmable delays can be utilized and the disclosed aspects are not limited to four programmable delays.

The outputs of the one or more programmable delays can be selected and a weight can be applied. For example, the output of the first power predictor signal $1202_1$ can be selected $1204_1$ and a first weight $1206_1$ can be applied to determine a first value. Further, the output of the second power predictor signal $1202_2$ can be selected $1204_2$ and a second weight $1206_2$ can be applied to determine a second value. In addition, the output of the Nth power predictor signal $1202_N$ can be selected $1204_N$ and an Nth weight $1206_N$ can be applied to determine an Nth value.

A sum 1208 of the first value, second value, through Nth value can be determined. The sum 1208 can be processed through one or more additional programmable delays (indicated by "D" within the square boxes) and one or more masks (indicated by "M" within the square boxes). The programmable delays can be utilized to tune the logic in post-silicon for better enablement. For example, the programmability can provide flexibility for correction in post-silicon.

Respective sums associated with outputs of the programmable delays and masks can be determined. For example, a first sum 1210 and a second sum 1212 can be determined and a difference 1214 between the first sum 1210 and the second sum 1212 can be evaluated. If the difference 1214 is less than a defined value 1216, proactive throttling 1218 can be applied (e.g., an instruction to throttle can be output). Accordingly, the configurable logic can allow for the calibration of the results and new settings for the proactive throttling can be defined. Further details will be provided below with respect to FIGS. 13-16.

Figure 13:
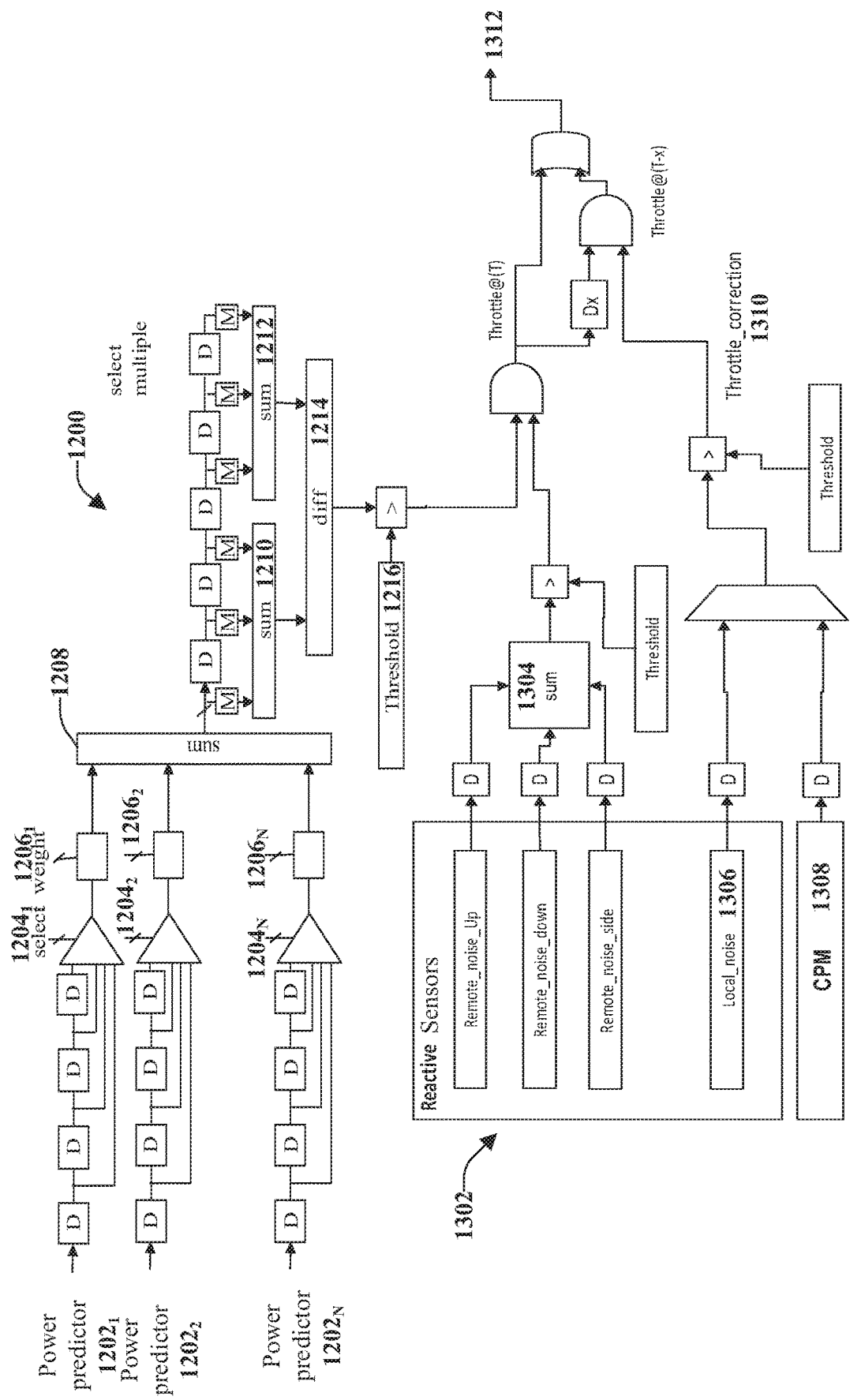
FIG. 13 illustrates another example, non-limiting, implementation that utilizes power predictor signals in accordance with one or more embodiments described herein.

FIG. 13 illustrates another example, non-limiting, implementation that utilizes power predictor signals in accordance with one or more embodiments described herein. Repetitive description of like elements employed in other embodiments described herein is omitted for sake of brevity. Illustrated in FIG. 13 is a cycle-by-cycle activity of a logic flow 1300.

As illustrated, the result of the logic flow 1200 (e.g., the difference 1214 between the first sum 1210 and the second sum 1212 as compared to the defined value 1216) can be input to a logic gate with results from the reactive mitigation logic. For example, results from one or more remote reactive sensors 1302 (e.g., the remote noise indicators 804, the reactive noise sensor, and so on) can be input through respective programmable delays and added together, at 1304. The resulting values of the one or more remote reactive sensors 1304 can be combined with the result of the logic flow 1200 of FIG. 12.

Further, a local noise value 1306 and a value from a critical path monitor 1308 can be utilized and a throttle correction 1310 can be applied. The result of the throttle correction 1310 can be included with the combination of the logic flow 1200 and the information from the one or more remote reactive sensors 1302, processed through a delay of x processor unit cycles (Dx) to determine the number of cycles for throttling 1312. The programmable delays of FIG. 12 and FIG. 13 can be utilized to allow time for the logic to be implemented and performed in the hardware. Further details with be provided below with respect to FIGS. 14-16.

Figure 14:
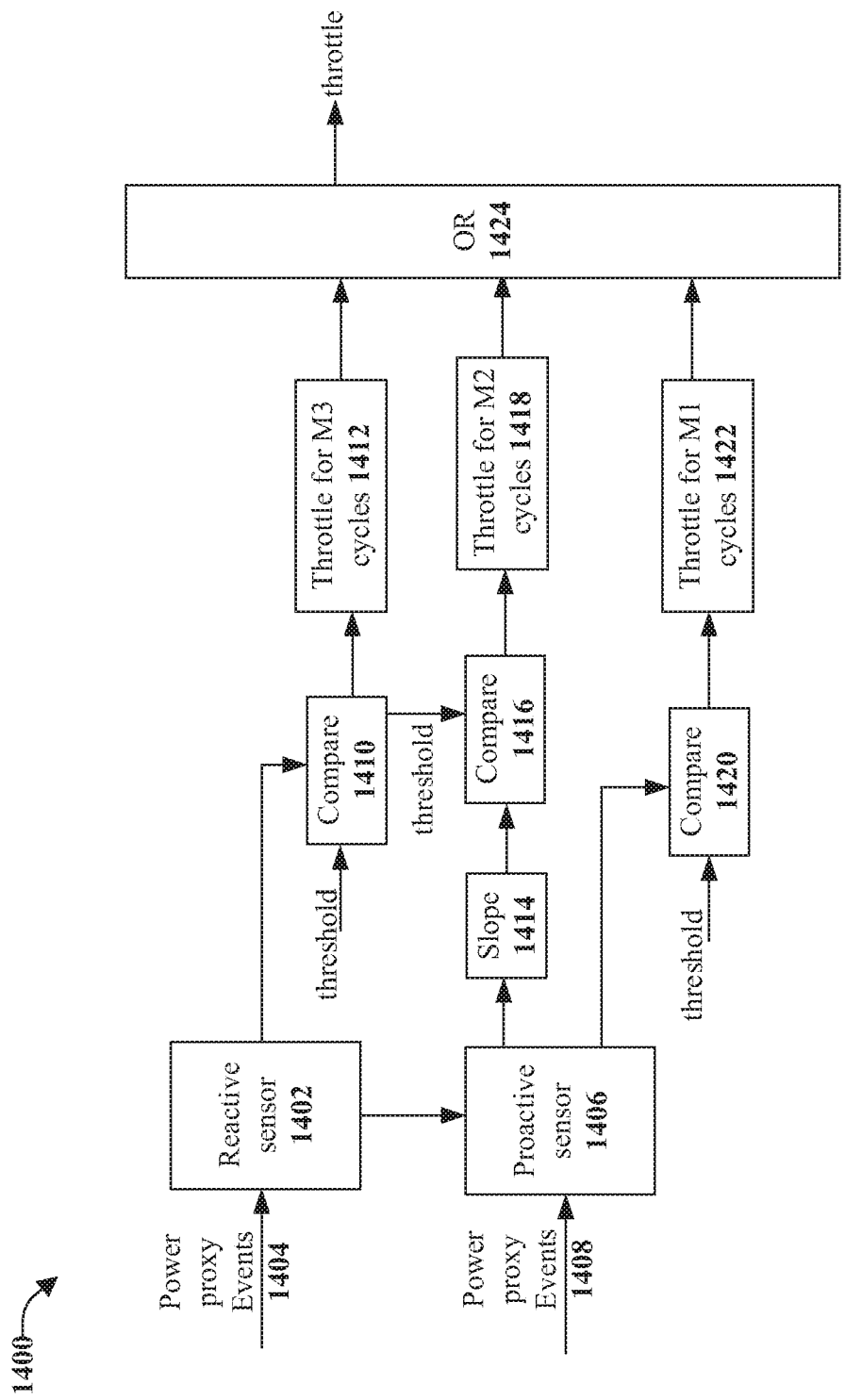
FIG. 14 illustrates an example, non-limiting, logic flow for mid frequency droop mitigation in accordance with one or more embodiments described herein.

FIG. 14 illustrates an example, non-limiting, logic flow 1400 for mid-frequency droop mitigation in accordance with one or more embodiments described herein. Repetitive description of like elements employed in other embodiments described herein is omitted for sake of brevity.

A reactive sensor 1402 (e.g., a reactive implementation) can receive one or more power proxy events 1404. Further, a proactive sensor 1406 (e.g., a proactive implementation) can receive one or more power proxy events 1408. The power proxy events 1404 and the power proxy events 1408 can be the same events, or at least some of the proxy events can be different events.

A first comparison 1410 can be performed between an output of the reactive sensor 1402 and a defined value. Based on the first comparison 1410, throttling can be performed for a first defined number of cycles (e.g., M3 cycles), at 1412. Outputs of the proactive sensor 1406 can be evaluated in two different ways. First, an output of the proactive sensor 1406 can be input to a slope 1414 and the output compared 1416 to a defined value. Throttling can be performed for a second defined number of cycles (e.g., M2 cycles), at 1418. In a second implementation, the output of the proactive sensor 1406 can be compared 1420 to a defined value and, based on the comparison, throttling can be performed for third defined number of cycles (e.g., M1 cycles), at 1422.

The throttling decision at 1412, 1418, and 1422, can be processed through an OR decision block 1424 and the throttle signal corresponding to the logic can be sent to the one or more processor cores. For example, the throttle decision can be sent to the processor cores as illustrated and described with respect to FIG. 3, for example.

Figure 15:
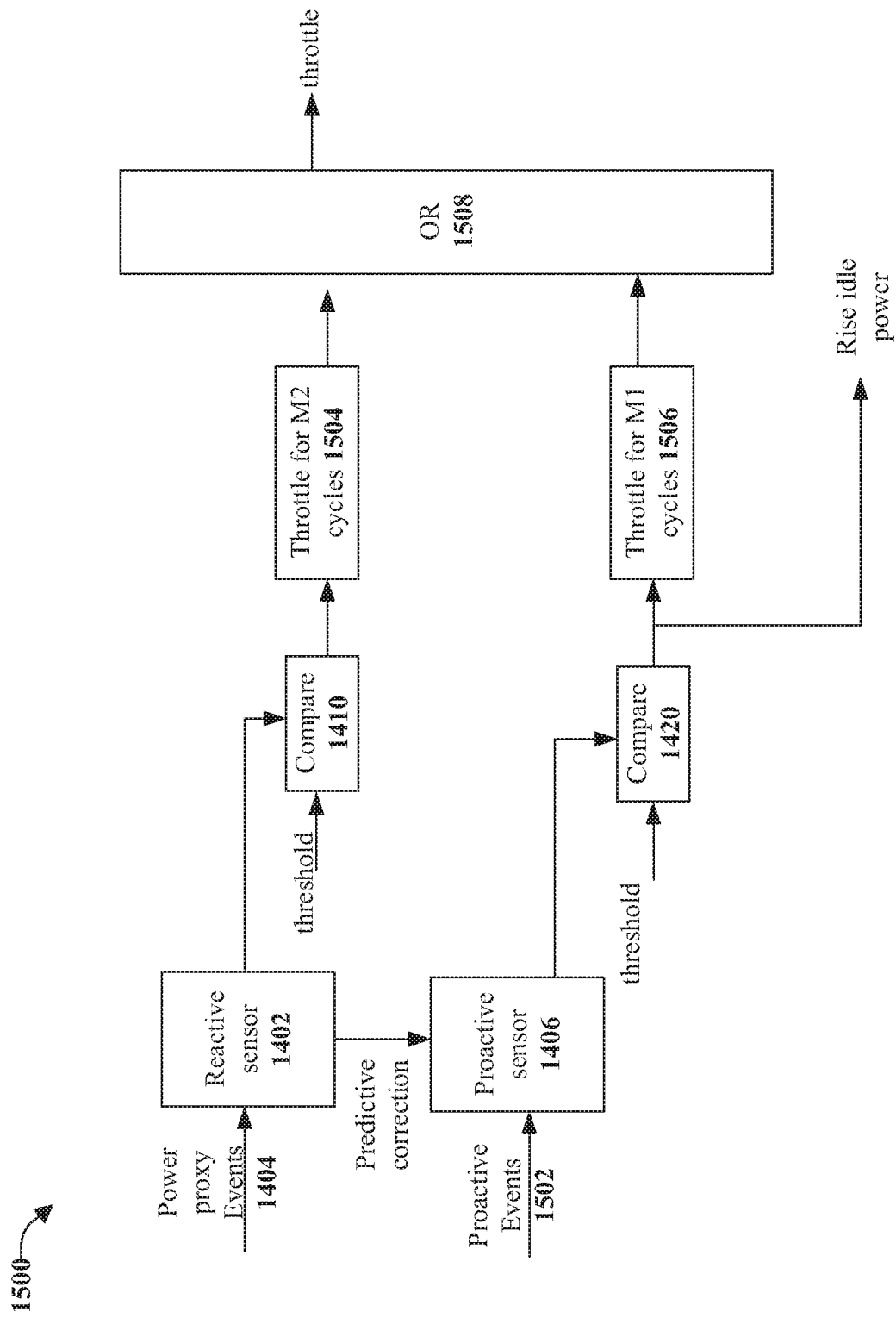
FIG. 15 illustrates an example, non-limiting, logic flow in accordance with one or more embodiments described herein.

FIG. 15 illustrates another example, non-limiting, logic flow 1500 in accordance with one or more embodiments described herein. Repetitive description of like elements employed in other embodiments described herein is omitted for sake of brevity.

As illustrated, the reactive sensor 1402 can receive the one or more power proxy events 1404. The proactive sensor 1406 can receive one or more proactive events 1502. In this implementation, the proactive sensor 1406 can be beneficial if the proactive sensor 1406 can predict a voltage droop a defined number of cycles ahead of the actual d(i)/d(t) event. Therefore, the proactive sensor 1406 can be implemented at core level. It is noted that the defined number of cycles can be determined based on the number of cycles for information to be transferred from the core, to the nest, and back to the core. For example, a first comparison 1410 can result in a throttle for M2 cycles 1504, and a second comparison 1420 can result in a throttle for M1 cycles 1506. The throttling decisions 1504 and 1506 can be processed through an OR decision block 1508 and a throttle instruction can be transmitted. In a non-limiting example, the number of cycles for information transfer can be about 25 cycles and, therefore, the defined number of cycles can be 10 to 20 cycles. However, the disclosed aspects are not limited to these number of cycles.

Figure 16:
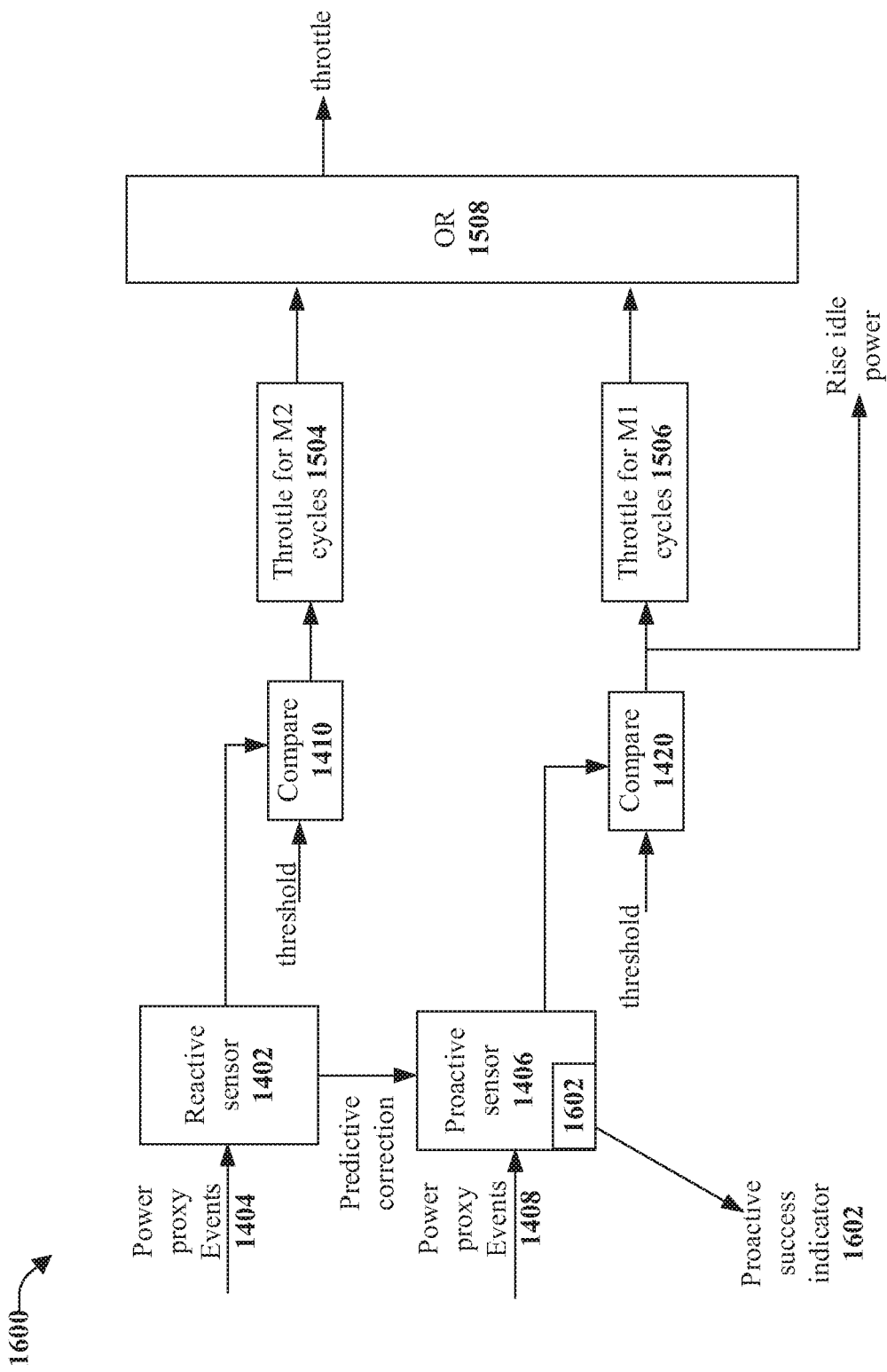
FIG. 16 illustrates another example, non-limiting, logic flow in accordance with one or more embodiments described herein.

FIG. 16 illustrates another example, non-limiting, logic flow 1600 in accordance with one or more embodiments described herein. Repetitive description of like elements employed in other embodiments described herein is omitted for sake of brevity.

As illustrated, a proactive success indicator 1602 can be utilized. The proactive success indicator 1602 can guard against erroneous proactive engagement. The proactive success indicator 1602 can be part of a feedback loop. For example, the proactive success indicator 1602 can be the feedback component 106 of FIG. 1.

There can be two modes that the proactive success indicator can operate in: an off-line diagnostic mode and an on-line mode. In the off-line diagnostic mode, if a noise is being predicted, it can be recorded but no throttling signal is generated. Local critical path monitor (CPM) information can be then used to verify if a noise actually occurs.

Figure 17:
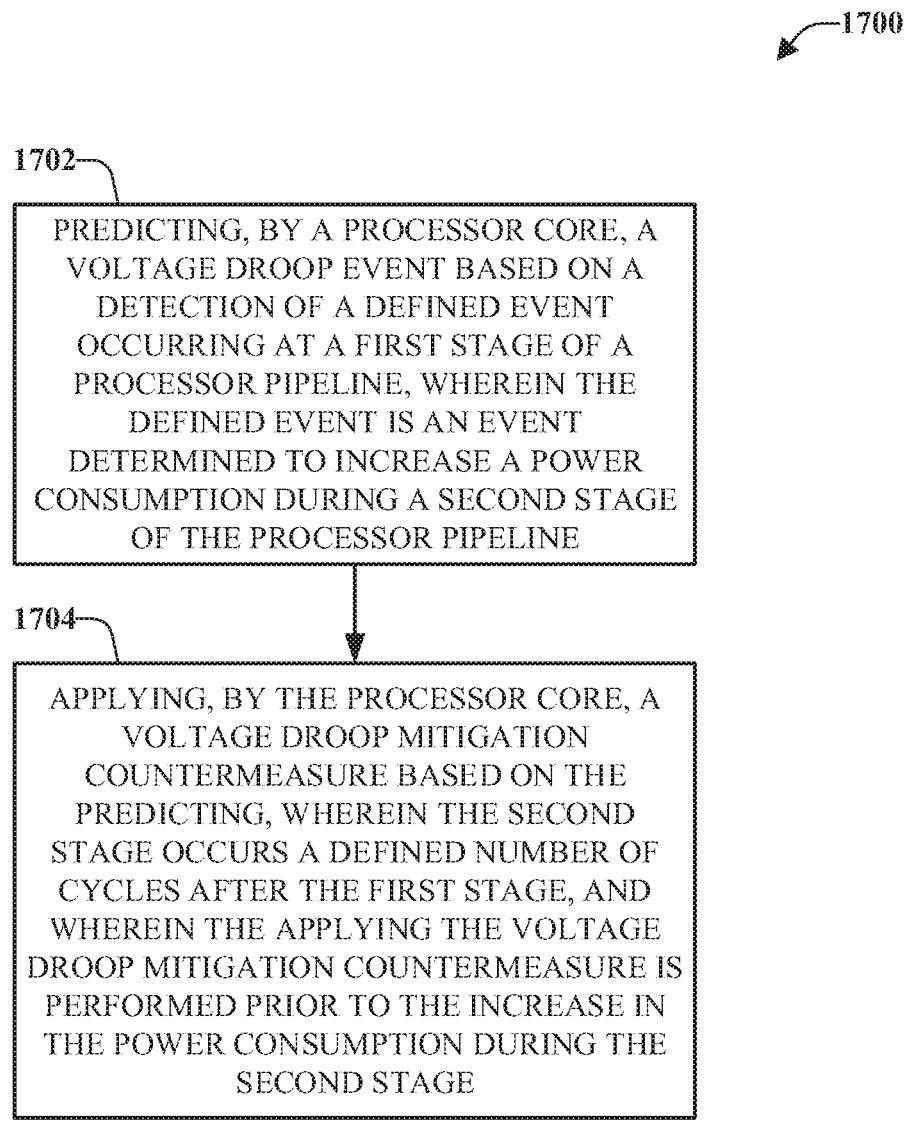
FIG. 17 illustrates a flow diagram of an example, non-limiting, computer-implemented method for proactive voltage droop reduction and/or mitigation in a processor core in accordance with one or more embodiments described herein.

For the on-line mode, if a noise is being predicted, a throttling signal can be generated and inserted to the pipeline. The amount of noise being mitigated as a result of this throttling signal can be estimated and compared with the local CPM information later. If both information match or are within a defined error amount, a success can be declared, FIG. 17 illustrates a flow diagram of an example, non-limiting, computer-implemented method 1700 for proactive voltage droop reduction and/or mitigation in a processor core in accordance with one or more embodiments described herein. Repetitive description of like elements employed in other embodiments described herein is omitted for sake of brevity. According to some implementations, the computer-implemented method 1700 can be implemented by a processor core and/or a system comprising a processor.

The various aspects discussed herein relate to proactive droop mitigation that utilizes selected events from earlier stages of a deep pipeline processor as predictors (or indicators) to predict sharp change in the power over a short period of time. The early information of the selected events can allow to throttle the flow through the pipeline and prevent the sharp power change before it actually takes place and, thus reduce and/or mitigate the voltage droop. Accordingly, the various aspects provide for the start of the mitigation before the actual power change or voltage droop happens and, therefore, can reduce and/or minimize the size of the voltage droop.

At 1702 of computer-implemented method 1700, a voltage droop event can be predicted based on a detection of a defined event occurring at a first stage of a processor pipeline (e.g., via the observation component 102). The defined event can be an event determined to increase a power consumption during a second stage of the processor pipeline. In accordance with an implementation, the defined event can be selected from one or more defined events. Further, to this implementation, the one or more defined events can be determined to increase the power consumption during the second stage of the processor pipeline.

A voltage droop mitigation countermeasure can be applied, at 1704 of computer-implemented method 1700, based on the prediction at 1702 of computer-implemented method 1700 (e.g., via the instruction component 104). The second stage occurs a defined number of cycles upon or after the first stage. According to an implementation, applying the voltage droop mitigation countermeasure can be performed prior to the increase in the power consumption during the second stage.

In accordance with some implementations, applying the voltage droop mitigation countermeasure can comprise generating a throttling signal based on a determination that an activity level, at the second stage, satisfies a defined activity level, and a remote noise level, at the second stage, satisfies a defined remote noise (e.g., via the noise level analysis component 704 and/or the voltage comparison component 1106).

According to some implementations, the predicting can comprise scoring a combination of a first weighted value from a first indicator and at least a second weighted value from at least a second indicator (e.g., via the scoring component 902). Further to this implementation, the applying the voltage droop mitigation countermeasure can comprise computing a throttling level based on the combination of the first weighted value and at least the second weighted value.

In some implementations, a determination can be made that the predicted power consumption did not occur. Therefore, in accordance with these implementations, the computer-implemented method 1700 can comprise terminating the voltage droop mitigation countermeasure based on a determination that the power consumption did not increase during the second stage of the processor pipeline (e.g., via the voltage comparison component 1106).

Figure 18:
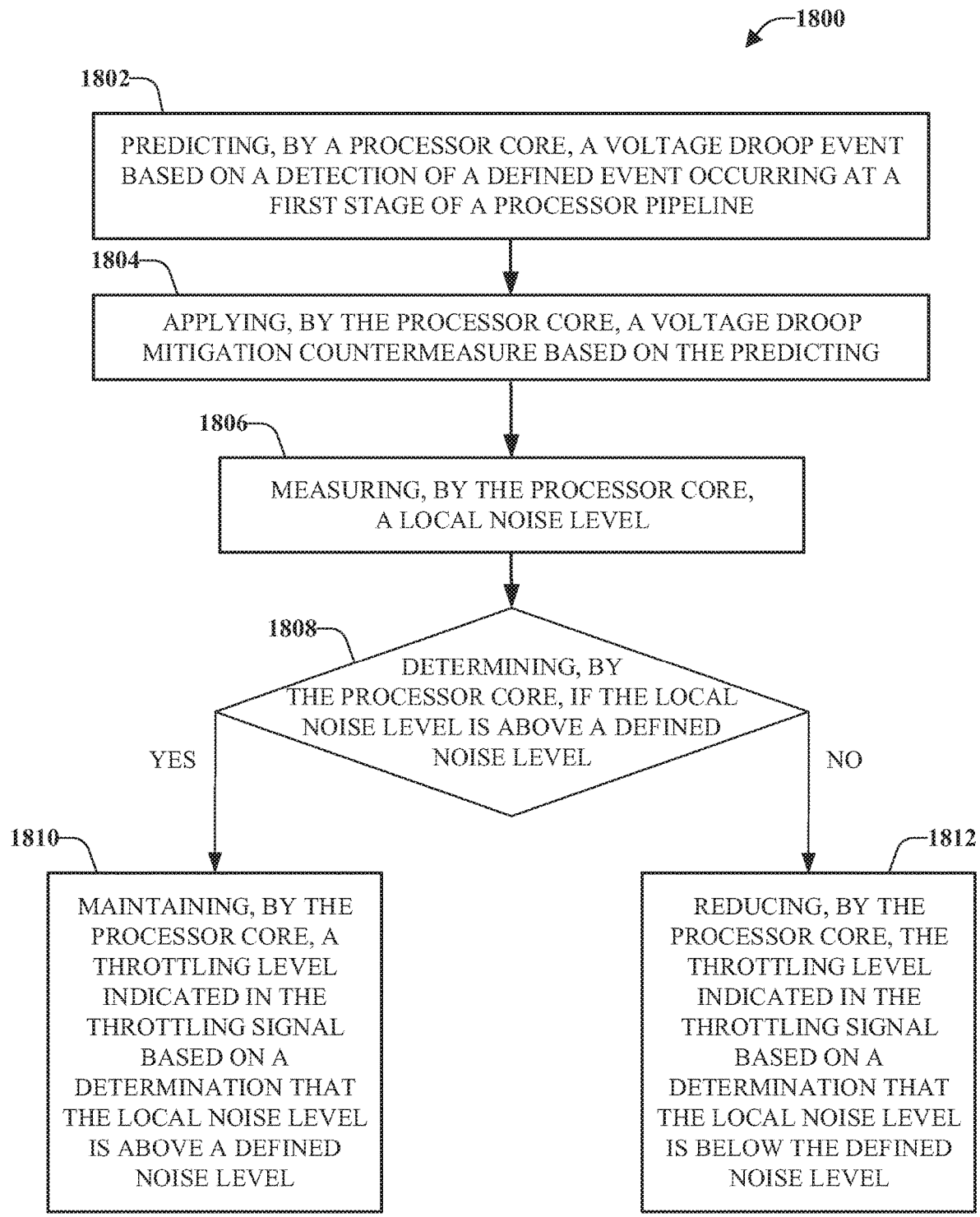
FIG. 18 illustrates a flow diagram of an example, non-limiting, computer-implemented method for selectively adjusting a proactive mitigation countermeasure based on measuring a local noise level in accordance with one or more embodiments described herein.

FIG. 18 illustrates a flow diagram of an example, non-limiting, computer-implemented method 1800 for selectively adjusting a proactive mitigation countermeasure based on measuring local noise level in accordance with one or more embodiments described herein. Repetitive description of like elements employed in other embodiments described herein is omitted for sake of brevity. According to some implementations, the computer-implemented method 1800 can be implemented by a processor core and/or a system comprising a processor.

At 1802 of computer-implemented method 1800, a voltage droop event can be predicted based on a detection of a defined event that is occurring at a first stage of a processor pipeline (e.g., via the observation component 102). The defined event can be an event that has been determined to increase a power consumption during a second (or a later) stage of the processor pipeline. Based on the prediction, a voltage droop mitigation countermeasure can be applied, at 1804 of computer-implemented method 1800 (e.g., via the instruction component 104).

At 1806, a local noise level can be measured (e.g., via the measurement component 702) and, at 1808 of computer-implemented method 1800, a determination can be made whether the local noise level is above a defined noise level (e.g., via the noise level analysis component 704). If the local noise level is determined to be above the defined noise level ("YES"), at 1810 of computer-implemented method 1800, the throttling level indicated in the throttling signal can be maintained (e.g., via the instruction component 104). However, if it is determined at 1808 that the local noise level is not above the defined noise level ("NO"), at 1812 of computer-implemented method 1800, the throttling level indicated in the throttling signal can be reduced (e.g., via the instruction component 104).

Figure 19:
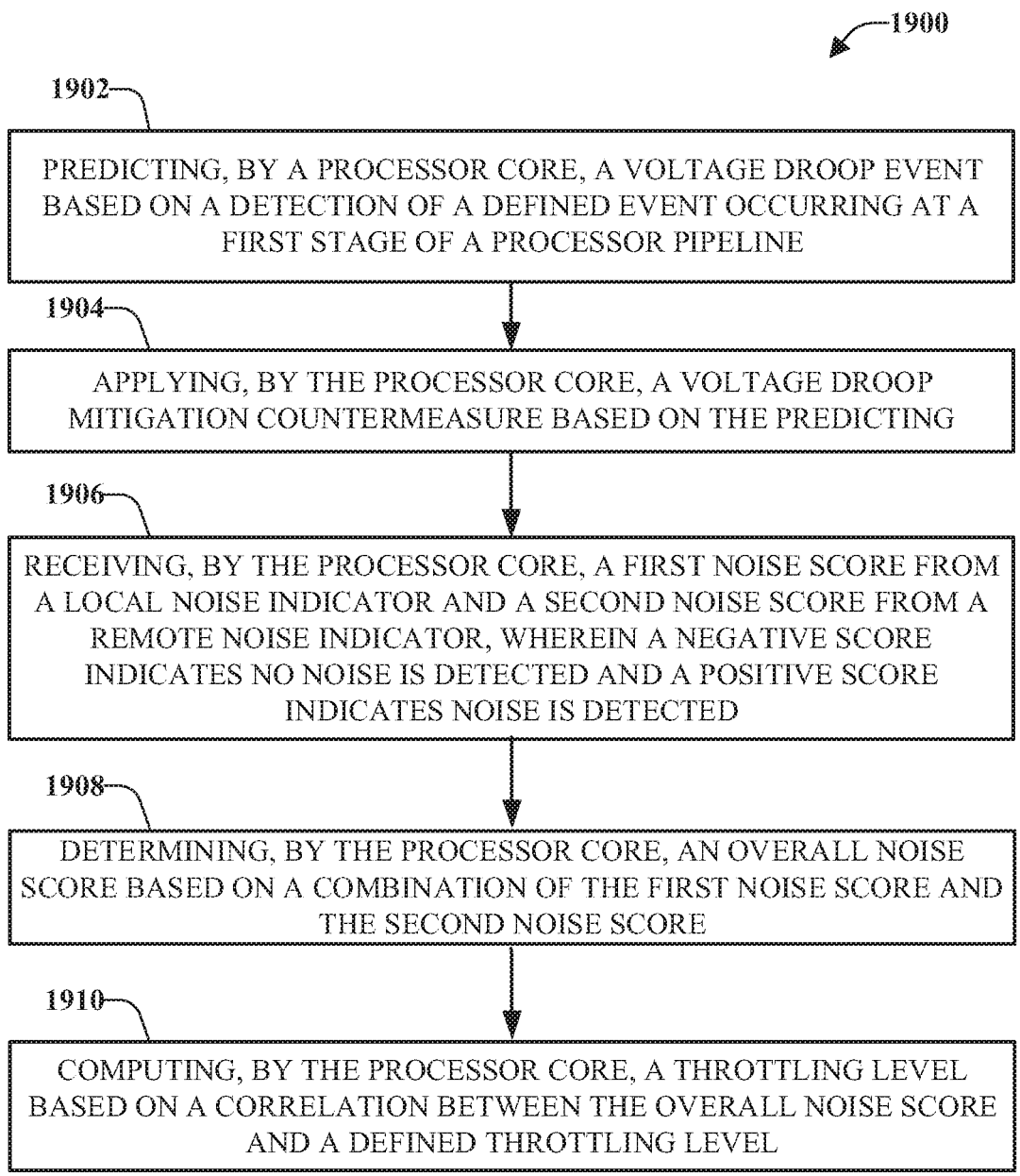
FIG. 19 illustrates a flow diagram of an example, non-limiting, computer-implemented method for selectively adjusting a proactive mitigation countermeasure based on a local noise level and a remote noise level in accordance with one or more embodiments described herein.

FIG. 19 illustrates a flow diagram of an example, non-limiting, computer-implemented method 1900 for selectively adjusting a proactive mitigation countermeasure based on a local noise level and a remote noise level in accordance with one or more embodiments described herein. Repetitive description of like elements employed in other embodiments described herein is omitted for sake of brevity. According to some implementations, the computer-implemented method 1900 can be implemented by a processor core and/or a system comprising a processor.

At 1902 of computer-implemented method 1900, a voltage droop event can be predicted based on a detection of a defined event that is occurring at a first stage of a processor pipeline (e.g., via the observation component 102). The defined event can be an event that has been determined to increase a power consumption during a second (or a later) stage of the processor pipeline. Based on the prediction, a voltage droop mitigation countermeasure can be applied, at 1904 of computer-implemented method 1900 (e.g., via the instruction component 104).

At 1906 of computer-implemented method 1900, a first noise score can be received from a local noise indicator and a second noise score can be received from a remote noise indicator (e.g., via the noise level determination component 806). A negative score can indicate no noise is detected and a positive score can indicate noise is detected. However, the disclosed aspects are not limited to this implementation.

At 1908 of computer-implemented method 1900, an overall noise score can be determined based on a combination of the first noise score and the second noise score (e.g., via the scoring component 902). A throttling level can be computed, at 1910 of computer-implemented method 1900, based on a correlation between the overall noise score and a defined throttling level (e.g., via the instruction component 104).

Figure 20:
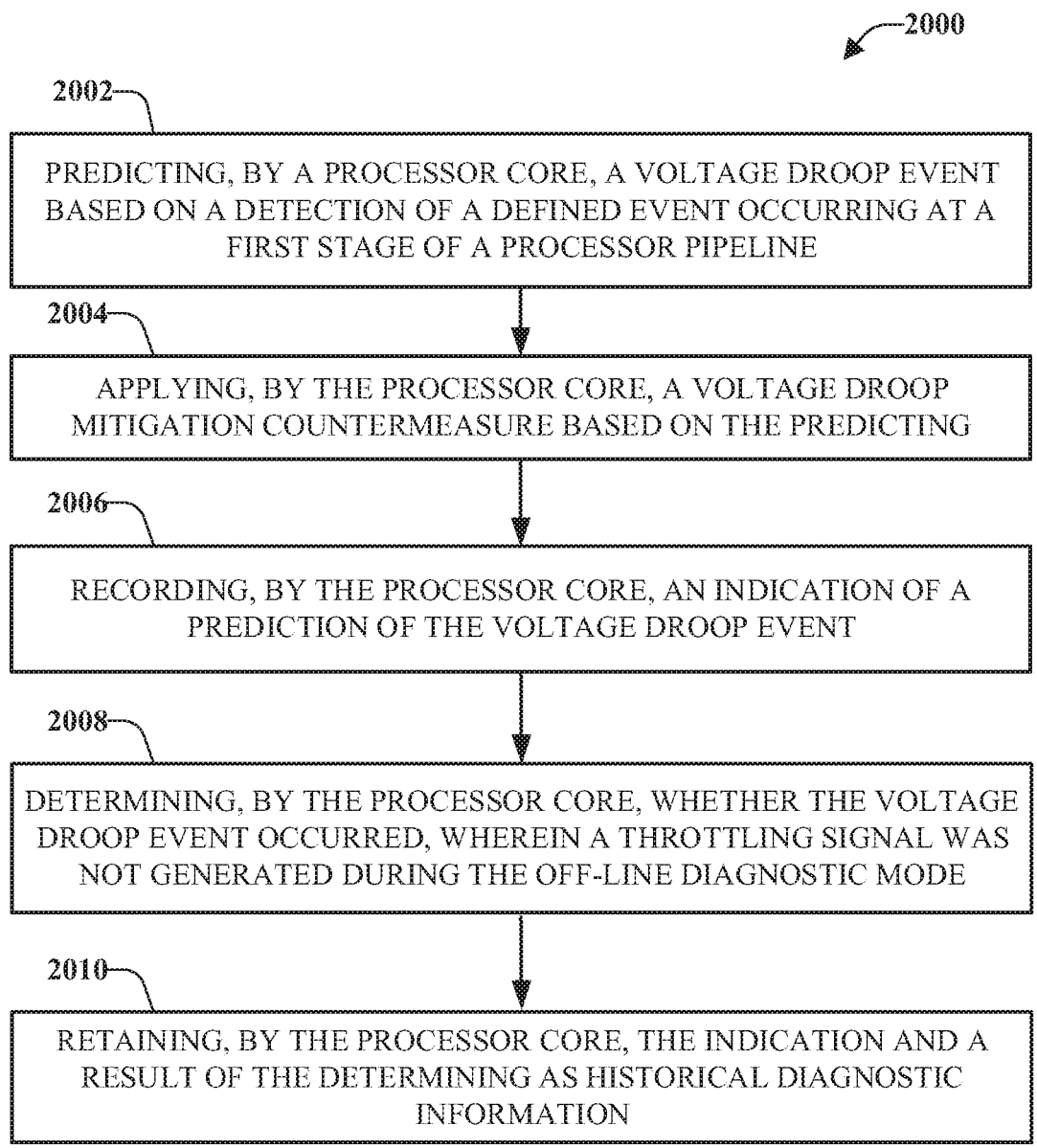
FIG. 20 illustrates a flow diagram of an example, non-limiting, computer-implemented method for selectively applying a voltage droop mitigation countermeasure during an off-line diagnostic mode in accordance with one or more embodiments described herein.

FIG. 20 illustrates a flow diagram of an example, non-limiting, computer-implemented method 2000 for selectively applying a voltage droop mitigation countermeasure during an off-line diagnostic mode in accordance with one or more embodiments described herein. Repetitive description of like elements employed in other embodiments described herein is omitted for sake of brevity. According to some implementations, the computer-implemented method 2000 can be implemented by a processor core and/or a system comprising a processor.

A voltage droop event can be predicted, at 2002 of computer-implemented method 2000, based on a detection of a defined event that is occurring at a first stage of a processor pipeline (e.g., via the observation component 102). The defined event can be an event that has been determined to increase a power consumption during a second (or a later) stage of the processor pipeline. Based on the prediction, at 2004 of computer-implemented method 2000, a voltage droop mitigation countermeasure can be applied (e.g., via the instruction component 104).

An indication of a prediction of the voltage droop event can be recorded, at 2006 of computer-implemented method 2000 (e.g., via the tracking component 1108). At 2008 of computer-implemented method 2000, it can be determined whether the voltage droop event occurred (e.g., via the detection component 1102). A throttling signal was not generated during the off-line diagnostic mode. Further, at 2010 of computer-implemented method 2000, the indication and a result of the determining can be retained as historical diagnostic information (e.g., via the tracking component 1108).

Figure 21:
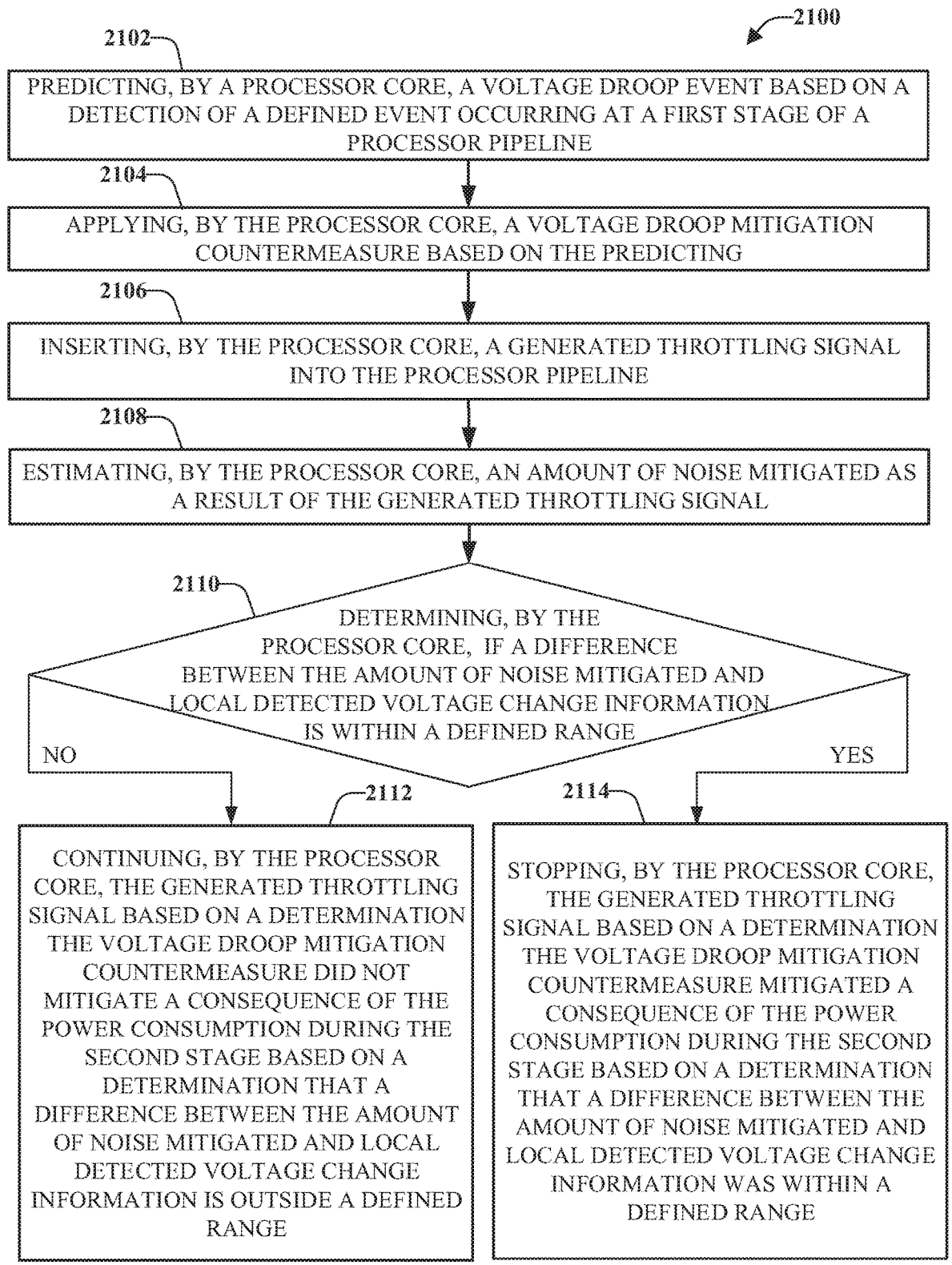
FIG. 21 illustrates a flow diagram of an example, non-limiting, computer-implemented method for selectively applying a voltage droop mitigation countermeasure during an on-line mode in accordance with one or more embodiments described herein.

FIG. 21 illustrates a flow diagram of an example, non-limiting, computer-implemented method 2100 for selectively applying a voltage droop mitigation countermeasure during an on-line mode in accordance with one or more embodiments described herein. Repetitive description of like elements employed in other embodiments described herein is omitted for sake of brevity. According to some implementations, the computer-implemented method 2100 can be implemented by a processor core and/or a system comprising a processor.

A voltage droop event can be predicted, at 2102 of computer-implemented method 2100, based on a detection of a defined event that is occurring at a first stage of a processor pipeline (e.g., via the observation component 102). The defined event can be an event that has been determined to increase a power consumption during a second (or a later) stage of the processor pipeline. According to some implementations, during the on-line mode, the prediction can be made based on a noise level. Based on the prediction, at 2104 of computer-implemented method 2100, a voltage droop mitigation countermeasure can be applied (e.g., via the instruction component 104).

At 2106 of the computer-implemented method 2100, a generated throttling signal can be inserted into the processor pipeline (e.g., via the instruction component 104). An amount of noise mitigated as a result of the generated throttling signal can be estimated, at 2108 of computer-implemented method 2100 (e.g., via the noise level determination component 806). At 2110 of the computer-implemented method 2100, a determination can be made whether a difference between the amount of noise mitigated and local detected voltage change information is within a defined range (e.g., via the feedback component 106).

If the difference is not within the defined range ("NO"), the computer-implemented method 2100 can, at 2110, continue to generate the throttling signal based on the determination that the voltage droop mitigation countermeasure did not mitigate a consequence of the power consumption during the second stage. Alternatively, if the difference is within the defined range ("YES"), the computer-implemented method 2100, at 2112, can stop the generated throttling signal based on a determination that the voltage droop mitigation countermeasure mitigated a consequence of the power consumption during the second stage.

Further, at 2110 of computer-implemented method 2100, it can be determined that the voltage droop mitigation countermeasure mitigated a consequence of the power consumption during the second stage based on a determination that a difference between the amount of noise mitigated and local detected voltage change information was within a defined range (e.g., via the feedback component 106).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 22:
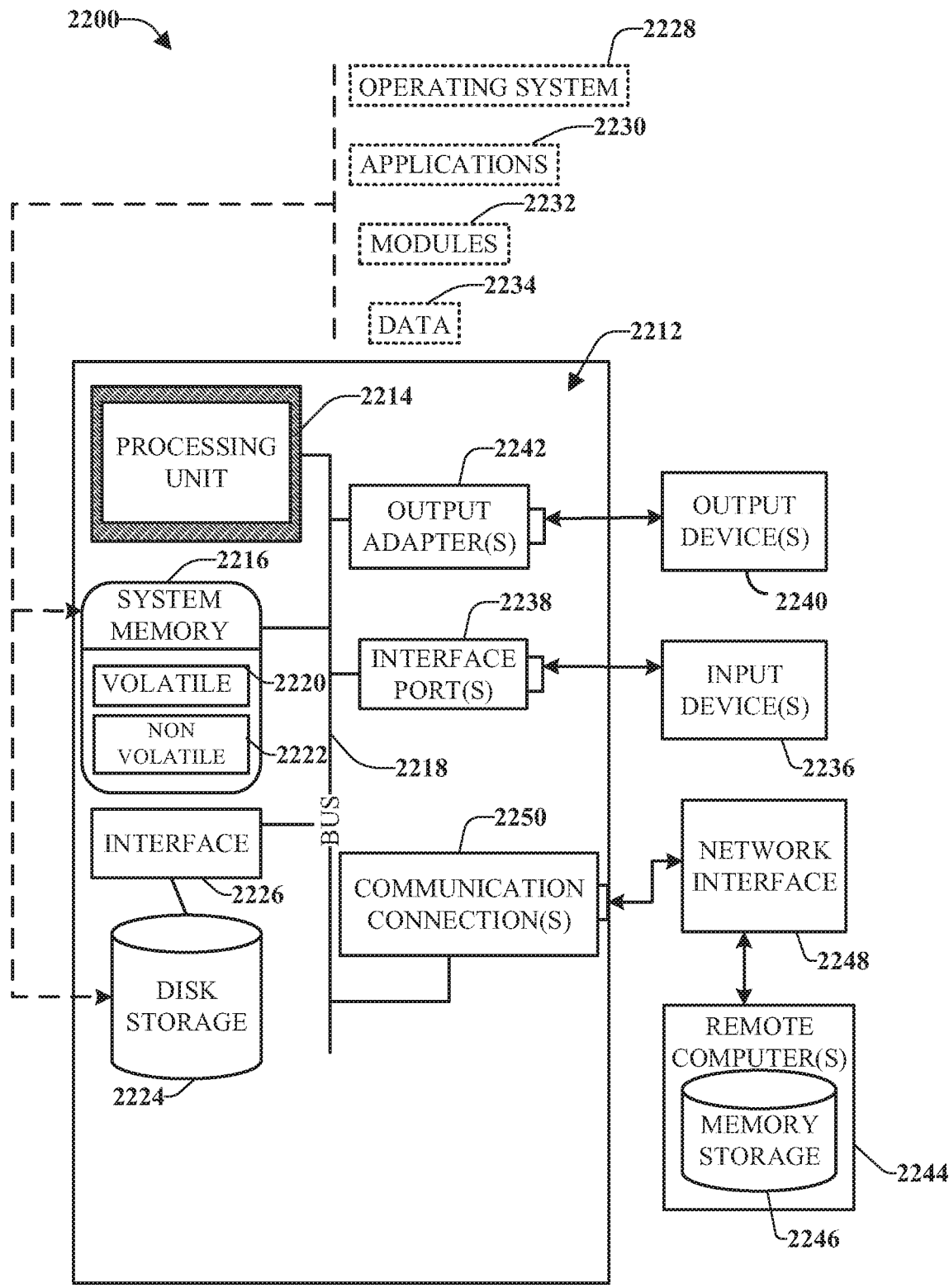
FIG. 22 illustrates a block diagram of an example, non-limiting, operating environment in which one or more embodiments described herein can be facilitated.

In order to provide a context for the various aspects of the disclosed subject matter, FIG. 22 as well as the following discussion are intended to provide a general description of a suitable environment in which the various aspects of the disclosed subject matter can be implemented. FIG. 22 illustrates a block diagram of an example, non-limiting operating environment in which one or more embodiments described herein can be facilitated. Repetitive description of like elements employed in other embodiments described herein is omitted for sake of brevity. With reference to FIG. 22, a suitable operating environment 2200 for implementing various aspects of this disclosure can also include a computer 2212. The computer 2212 can also include a processing unit 2214, a system memory 2216, and a system bus 2218. The system bus 2218 couples system components including, but not limited to, the system memory 2216 to the processing unit 2214. The processing unit 2214 can be any of various available processors. Dual microprocessors and other multiprocessor architectures also can be employed as the processing unit 2214. The system bus 2218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 2216 can also include volatile memory 2220 and nonvolatile memory 2222. The basic input/output system (BIOS), containing the basic routines to transfer information between elements within the computer 2212, such as during start-up, is stored in nonvolatile memory 2222. By way of illustration, and not limitation, nonvolatile memory 2222 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 2220 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 2212 can also include removable/non-removable, volatile/non-volatile computer storage media. FIG. 22 illustrates, for example, a disk storage 2224. Disk storage 2224 can also include, but is not limited to, devices like a magnetic disk drive, floppy disk drive, tape drive, Jaz drive, Zip drive, LS-100 drive, flash memory card, or memory stick. The disk storage 2224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2224 to the system bus 2218, a removable or non-removable interface is typically used, such as interface 2226. FIG. 22 also depicts software that acts as an intermediary between users and the basic computer resources described in the suitable operating environment 2200. Such software can also include, for example, an operating system 2228. Operating system 2228, which can be stored on disk storage 2224, acts to control and allocate resources of the computer 2212. System applications 2230 take advantage of the management of resources by operating system 2228 through program modules 2232 and program data 2234, e.g., stored either in system memory 2216 or on disk storage 2224. It is to be appreciated that this disclosure can be implemented with various operating systems or combinations of operating systems. A user enters commands or information into the computer 2212 through input device(s) 2236. Input devices 2236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2214 through the system bus 2218 via interface port(s) 2238. Interface port(s) 2238 include, for example, a serial port, a parallel port, a game port, and a universal serial bus (USB). Output device(s) 2240 use some of the same type of ports as input device(s) 2236. Thus, for example, a USB port can be used to provide input to computer 2212, and to output information from computer 2212 to an output device 2240. Output adapter 2242 is provided to illustrate that there are some output devices 2240 like monitors, speakers, and printers, among other output devices 2240, which require special adapters. The output adapters 2242 include, by way of illustration and not limitation, video and sound cards that provide a method of connection between the output device 2240 and the system bus 2218. It should be noted that other devices and/or systems of devices provide both input and output capabilities such as remote computer(s) 2244.

Computer 2212 can operate in a networked environment using logical connections to one or more remote computers, such as remote computer(s) 2244. The remote computer(s) 2244 can be a computer, a server, a router, a network PC, a workstation, a microprocessor based appliance, a peer device or other common network node and the like, and typically can also include many or all of the elements described relative to computer 2212. For purposes of brevity, only a memory storage device 2246 is illustrated with remote computer(s) 2244. Remote computer(s) 2244 is logically connected to computer 2212 through a network interface 2248 and then physically connected via communication connection 2250. Network interface 2248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 2250 refers to the hardware/software employed to connect the network interface 2248 to the system bus 2218. While communication connection 2250 is shown for illustrative clarity inside computer 2212, it can also be external to computer 2212. The hardware/software for connection to the network interface 2248 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible embodiments of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative embodiments, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor that executes the computer executable components stored in the memory, wherein the computer executable components comprise:
        an instruction component that applies, during a first stage of a processor pipeline, a voltage droop mitigation countermeasure prior to a predicted increase of a level of power to be consumed during a second stage of the processor pipeline, wherein the voltage droop mitigation countermeasure comprises:
            determination of an overall noise level based on a combination of a local noise level and a remote noise level; and
            computation of a throttling level to apply to the processor pipeline based on a correlation between the overall noise level and a defined throttling level; and
    a feedback component that provides a notification to the instruction component that indicates whether the voltage droop mitigation countermeasure was successful, and
    wherein the instruction component:
        continues to generate a throttling signal based on a determination that a difference between an amount of noise mitigated and local detected voltage change information fails to be within a defined range as determined by the feedback component; and
        stopping generation of the throttling signal based on a determination that a difference between an amount of noise mitigated and the local detected voltage change information is within the defined range as determined by the feedback component.

2. The system of claim 1, wherein the instruction component generates the throttling signal according to the throttling level based on a determination that an activity level, at the second stage, satisfies a defined activity level, and the remote noise level, at the second stage, satisfies a defined remote noise level.

3. The system of claim 2, further comprising:
an observation component that determines the activity level continues to satisfy the defined activity level.

4. The system of claim 1, further comprising:
a local noise indicator that measures the local noise level; and
a remote noise indicator that measures the remote noise level.

5. The system of claim 1, further comprising:
a detection component that determines an occurrence of a voltage droop event at the second stage.

6. The system of claim 1, wherein the overall noise level is based upon weights applied to the local noise level and remote noise level.

7. The system of claim 1, wherein the voltage droop mitigation countermeasure applied by the instruction component increases a processing efficiency of the processor.

8. A computer-implemented method, comprising:
applying, by a processor core, during a first stage of a processor pipeline, a voltage droop mitigation countermeasure prior to a predicted increase of a level of power to be consumed during a second stage of the processor pipeline, wherein the voltage droop mitigation countermeasure comprises:
determining an overall noise level based on a combination of a local noise level and a remote noise level; and
computing a throttling level to apply to the processor pipeline based on a correlation between the overall noise level and a defined throttling level; and
generating, by the processor core, a notification that indicates whether the voltage droop mitigation countermeasure was successful;
continuing, by the processor core, to generate a throttling signal based on a determination that a difference between an amount of noise mitigated and local detected voltage change information fails to be within a defined range as determined by the feedback component; and
stopping, by the processor core, generation of the throttling signal based on a determination that a difference between an amount of noise mitigated and the local detected voltage change information is within the defined range as determined by the feedback component.

9. The computer-implemented method of claim 8, generating, by the processor, the throttling signal according to the throttling level based on a determination that an activity level, at the second stage, satisfies a defined activity level, and the remote noise level, at the second stage, satisfies a defined remote noise level.

10. The computer-implemented method of claim 9, further comprising:
maintaining, by the processor core, the throttling level based on a determination that the local noise level is above a defined noise level; or
reducing, by the processor core, the throttling level indicated in the throttling signal based on a determination that the local noise level is below the defined noise level.

11. The computer-implemented method of claim 8, wherein the applying the voltage droop mitigation countermeasure comprises:
receiving, by the processor core, the local noise level from a local noise indicator and the remote noise level from a remote noise indicator.

12. The computer-implemented method of claim 8, further comprising:
determining, by the processor, an occurrence of a voltage droop event at the second stage.

13. The computer-implemented method of claim 8, wherein the overall noise level is based upon weights applied to the local noise level and remote noise level.

14. The computer-implemented method of claim 8, wherein the voltage droop mitigation countermeasure increases a processing efficiency of the processor.

15. A computer program product that facilitates proactive voltage droop mitigation, the computer program product comprising a computer readable storage medium having program instructions embodied therewith, the program instructions are executable by a processor to cause the processor to:
apply, during a first stage of a processor pipeline, a voltage droop mitigation countermeasure prior to a predicted increase of a level of power to be consumed during a second stage of the processor pipeline, wherein the voltage droop mitigation countermeasure comprises:
determine an overall noise level based on a combination of a local noise level and a remote noise level; and
compute a throttling level to apply to the processor pipeline based on a correlation between the overall noise level and a defined throttling level;
generate a notification that indicates whether the voltage droop mitigation countermeasure was successful;
a continuation of generation of a throttling signal based on a determination that a difference between an amount of noise mitigated and local detected voltage change information fails to be within a defined range as determined by the feedback component; and
a stopping of generation of the throttling signal based on a determination that a difference between an amount of noise mitigated and the local detected voltage change information is within the defined range as determined by the feedback component.

16. The computer program product of claim 15, wherein the program instructions cause the processor to:
generate the throttling signal according to the throttling level based on a determination that an activity level, at the second stage, satisfies a defined activity level, and the remote noise level, at the second stage, satisfies a defined remote noise level.

17. The computer program product of claim 16, wherein the program instructions cause the processor to:
maintain the throttling level based on a determination that the local noise level is above a defined noise level; or
reduce the throttling level indicated in the throttling signal based on a determination that the local noise level is below the defined noise level.

18. The computer program product of claim 15, wherein the program instructions cause the processor to:
measure the local noise level; and
measure the remote noise level.

19. The computer program product of claim 15, wherein the program instructions cause the processor to:
determine an occurrence of a voltage droop event at the second stage.

20. The computer program product of claim 15, wherein the overall noise level is based upon weights applied to the local noise level and remote noise level.

\* \* \* \* \*